United States Patent
Toledano et al.

(10) Patent No.: US 7,761,480 B2
(45) Date of Patent: Jul. 20, 2010

(54) INFORMATION ACCESS USING ONTOLOGIES

(75) Inventors: Zev Toledano, Jerusalem (IL); Jair Jehuda, Lower Galilee (IL)

(73) Assignee: Kinor Technologies Inc., D.N. Galil Tachton (IL)

(*) Notice: Subject to any disclaimer, the term of this patent is extended or adjusted under 35 U.S.C. 154(b) by 1124 days.

(21) Appl. No.: 10/565,400

(22) PCT Filed: Jul. 22, 2004

(86) PCT No.: PCT/IL2004/000667

§ 371 (c)(1), (2), (4) Date: Jan. 20, 2006

(87) PCT Pub. No.: WO2005/008358

PCT Pub. Date: Jan. 27, 2005

(65) Prior Publication Data

US 2006/0248045 A1 Nov. 2, 2006

Related U.S. Application Data

(60) Provisional application No. 60/489,768, filed on Jul. 22, 2003.

(51) Int. Cl.
*G06F 17/30* (2006.01)
(52) U.S. Cl. .................................. 707/804; 707/807
(58) Field of Classification Search ............... None
See application file for complete search history.

(56) References Cited

U.S. PATENT DOCUMENTS

| | | | |
|---|---|---|---|
| 6,442,545 B1 | 8/2002 | Feldman et al. | |
| 6,532,469 B1 | 3/2003 | Feldman et al. | |
| 6,604,093 B1 | 8/2003 | Etzion et al. | |
| 6,636,848 B1 | 10/2003 | Aridor et al. | |
| 6,847,974 B2 * | 1/2005 | Wachtel | 707/101 |
| 7,099,885 B2 * | 8/2006 | Hellman et al. | 707/103 R |
| 2001/0047485 A1 * | 11/2001 | Brown et al. | 713/201 |
| 2002/0120618 A1 | 8/2002 | Ushijima et al. | |
| 2002/0138353 A1 | 9/2002 | Schreiber et al. | |
| 2002/0143755 A1 | 10/2002 | Wynblatt et al. | |
| 2002/0194181 A1 | 12/2002 | Wachtel | |

(Continued)

OTHER PUBLICATIONS

Shah, A. "Source Specific Query Rewriting and Query Plan Generation for Merging XML-Based Semi-structured Dara in Mediation Systemes" University of Florida, May 2001, pp. 1-113, whole documents.

(Continued)

*Primary Examiner*—Khanh B Pham
(74) *Attorney, Agent, or Firm*—Fish & Richardson P.C.

(57) ABSTRACT

A method for data access includes defining an ontology for application to a set of diverse data sources (58) comprising data having predefined semantics, and associating with the ontology one or more logical rules applicable to the semantics of the data in the data sources. Upon receiving a query from a user regarding the data, a query plan is determined for responding to the query by selecting one or more of the data sources responsively to the ontology and by identifying an operation to be applied to the data responsively to the applicable logical rules. A response to the query is then generated in accordance with the query plan.

13 Claims, 13 Drawing Sheets

U.S. PATENT DOCUMENTS

| | | |
|---|---|---|
| 2003/0101170 A1 | 5/2003 | Edelstein et al. |
| 2003/0120665 A1 | 6/2003 | Fox et al. |
| 2003/0163450 A1 | 8/2003 | Borenstein et al. |
| 2003/0163597 A1 | 8/2003 | Hellman et al. |
| 2003/0177481 A1 | 9/2003 | Amaru et al. |
| 2003/0179228 A1 | 9/2003 | Schreiber et al. |
| 2004/0093344 A1 | 5/2004 | Berger et al. |
| 2004/0093559 A1 | 5/2004 | Amaru et al. |
| 2007/0027874 A1* | 2/2007 | Stoffel et al. ............. 707/9 |

OTHER PUBLICATIONS

Fowler et al. entitled "Agent-Based Semantic Interoperability in InfoSleuth" SIGMOD *Record* 28:1 (Mar. 1999), pp. 60-67.

U.S. Appl. No. 60/489,768, filed Jul. 22, 2003.

http://www.argreenhouse.com/InfoSleuth/index.shtml.

Schreiber, "Semantic information management (SIM): Solving the enterprise data problem by managing data based on its business meaning", 2003 (available at www.unicorn.com).

* cited by examiner

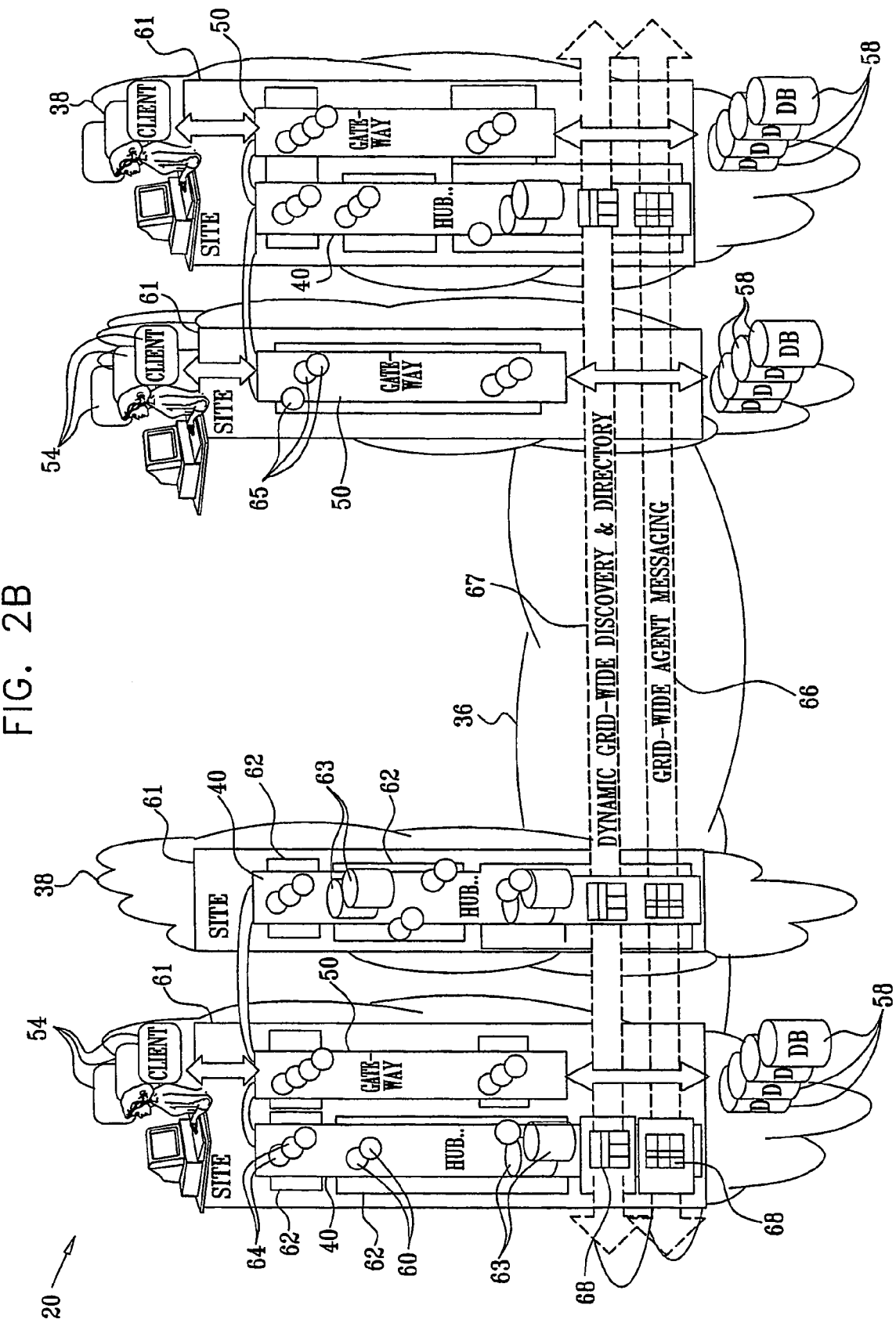

US 7,761,480 B2

INFORMATION ACCESS USING ONTOLOGIES

CROSS-REFERENCE TO RELATED APPLICATIONS

The above-referenced application is the U.S. National Phase of International Application No. PCT/IL2004/000667, filed Jul. 22, 2004, which claims priority from U.S. Provisional Patent Application No. 60/489,768 filed Jul. 22, 2003. The International application was published on Jan. 27, 2005 as WO 2005/008358 A3 under PCT article 21(2).

FIELD OF THE INVENTION

The present invention relates generally to methods and systems for providing access to information, and specifically to federated networks for providing integrated access to multiple, diverse information sources.

BACKGROUND OF THE INVENTION

There is a recognized need for data access systems and analytical tools that provide semantic interoperability among different information sources in a given application domain, both within a particular enterprise and across enterprise boundaries. Some tools that have been developed for this purpose make use of ontologies. An ontology is a structured vocabulary that represents the schematic metadata of a particular application domain. The ontology provides a unified, semantic model of the information in the domain, including both the types of entities that the information may include and relationships among the entities. The ontology allows users to express query concepts and relationships in high-level terms, which are then translated by appropriate agents into lower-level database schemata and semantic analyses.

One of the early tools of this sort was InfoSleuth™, developed at MCC (Microelectronics and Computer Technology Corporation, Austin, Tex.). InfoSleuth is described, for example, in an article by Fowler et al., entitled "Agent-Based Semantic Interoperability in InfoSleuth," *SIGMOD Record* 28:1 (March, 1999), pp. 60-67, which is incorporated herein by reference. InfoSleuth is an agent-based system, in which a set, or community, of agents collaborate at a semantic level to execute information gathering and analysis tasks. The underlying information sources can be diverse in both structure and content. The agents, which are coded in Java™, communicate at the semantic level over ontologies using a Knowledge Query Manipulation Language (KQML). Agent types defined by InfoSleuth include:

User agents, which provide a system interface that enables the user to communicate with the system.

Broker agents, which match requests for services or information with agents that can provide them.

An ontology agent, which serves the set of ontologies supported by InfoSleuth and provides details of the ontology on demand, Resource agents, which translate queries and data between the local forms in which they are stored and their InfoSleuth forms.

Value mapping agents, which convert queries and results between common acceptable forms and a canonical form defined by the ontology.

Multi-resource query agents, which handle the decomposition and distribution of sub-queries to various resource agents and then recompose the results.

Agents communicate and determine each other's capabilities using a shared ontological model of information management. The ontology provides the semantic framework for information activities in the domain of interest to the user. Semantic brokering allows agents to advertise their capabilities and to identify potential collaborators based on their advertised capabilities. The user may access the resources of the agent community from any location, and need know nothing about the physical location or structural characteristics of any resource.

Another method for distributed query handling is described by Wynblatt et al., in U.S. Patent Application Publication US 2002/0143755, whose disclosure is incorporated herein by reference. According to this method, a traditional database query is converted into network messages, which are routed to those data sources that have relevant data. The messages may be routed either directly or through designated query nodes. The data sources then send reply messages either directly to the originator of the query or via designated join nodes. In some embodiments, the data sources may be able to perform local join operations. The system collects the reply messages, and the messages that meet the requirements of the query are sent back to the query originator for presentation as a traditional database result.

Unicorn Solutions Inc. (New York, N.Y.) offers a Semantic Information Management (SIM) System, which it describes as a comprehensive platform for managing and integrating enterprise information resources. The system combines metadata repository, information modeling, hub-and-spoke mapping, and automated data transformation script generation capabilities. It is said to provide customers with a seamless business view by relating disparate data formats and interfaces to an information model that describes the business, its component parts, and all relationships. The system is described further in an article by Schreiber, entitled "Semantic Information Management (SIM): Solving the Enterprise Data Problem by Managing Data Based on its Business Meaning" (2003), which is available at www.unicorn.com and is incorporated herein by reference.

Various aspects of the Unicorn system are described in the patent literature. For example, U.S. Patent Application Publication US 2003/0163597, to Hellman et al., describes a method and system for collaborative ontology modeling, for use in building up an ontology from individual ontology efforts distributed over the Web. U.S. Patent Application Publication US 2004/0093344, to Berger et al., describes a method for mapping data schemas into an ontology model. U.S. Patent Application Publication US 2003/0101170, to Edelstein et al., describes a data query system using a central ontology model, in which a query processor generates a query in a data schema query language corresponding to a specified query expressed in an ontology query language. U.S. Patent Application Publication US 2003/0163450, to Borenstein et al., describes a method for providing a semantic registry for Web services and other services, based on an ontology model. The method is said to enable dynamic Web service integration by overcoming problems of semantic inconsistency. The disclosures of all the above patent application publications are incorporated herein by reference.

SUMMARY OF THE INVENTION

Embodiments of the present invention provide tools for use in a distributed, federated system for data management and access, based on a domain-specific ontology. In the embodiments disclosed hereinbelow, the system comprises a grid of agents and gateways, which communicate with one another over a communication network by exchanging semantic, ontology-based messages. The agents share a common, distributed platform, as well as a common directory of the ontology, data sources and rules that apply in the federated system. The gateways comprise wrappers, for interfacing between data sources and the ontology, as well as portals, through which users may address queries to the system. Upon receiving a user query, the portal directs the query to one of the agents, which develops a query plan based on the availability of necessary data and system resources for responding to the query. After collecting the required information in accordance with the query plan, the agent returns the query response to the user portal.

In embodiments of the present invention, the ontology accommodates logical rules that are applicable to the entities in the ontology, as well as to the attributes of and relationships between the entities. In some embodiments, the agent handling a query uses these rules in generating the query plan. For example, the agent may use the rules to determine which set of data fields, in which data sources, are most likely to give complete and correct data in response to a given query, and possibly also to validate the data that are collected in executing the query plan. The agent may also use the rules to determine the key according to which records from different sources should be joined, and whether the join should be performed by the agent or should be "pushed down" to the gateway for execution in order to optimize response or conserve system resources.

In some embodiments of the present invention, the ontological rules comprise access rules, indicating which user roles are authorized to read information in a given data source or set of sources. The access rules may pertain to particular data sources, to particular entities in the sources, or to particular attributes of a given type of entities. The access rules are expressed in unified terms, which may be maintained by a community of owners in the form of a community ontology that includes classes of roles, sources, clients, and authentication methods. These features of the ontology are thus useful in providing a unified model under which different data owners in a federated system may determine the access rules that are applicable to their data, such as which clients are trusted under which circumstances. The use of abstracted classes in the model, such as in a government database source, also enables clients and users to determine the scope of sources to be used without knowing each source specifically.

Typically, the access rules for each source are published together with additional source metadata in a grid-wide directory. Hence, the query agents can read the access rules immediately, without the need for central management of access authorizations. Since the access rules are already contained in the directory, there is no need for the agents to request authorization for each resource that is to be accessed (unless specifically required by the source owner). Furthermore, the agents may use the access rules in developing query plans so that the plan includes only those sources of information that the requesting user is authorized to access.

In some embodiments, access to each data source is logged along with the credentials of the user requesting the data. Thus, access policies are not only automatically enforced, but they are also recorded in a manner that supports automated auditing. Since the same mechanisms serve all grid-based client services, the services provided by the grid are automatically "regulated."

In some embodiments of the present invention, a network utility gathers and updates information regarding the topology and status of resources in the system. Based on this information, the agents and gateways are able to discover and integrate new sources of information as they become available, as well as to determine the level of computing and communication loads on different agents and data sources. Thus, in making and executing the query plans, agents may use the topology and status information in order to optimize response time and dynamically load-balance the resources of the system.

In some embodiments, the grid functions as an application-level virtual private network, which links and provides services to the member sites and organizations. This virtual private network is internally managed by distributed functions of the grid, so that individual member sites need not explicitly provision for or coordinate their own virtual private networks with the other member sites. Thus, agents in the grid may even balance the overall load among resources that belong to different organizations within the federated system. For this purpose, the grid directory may comprise entities and attributes relating to performance of application-related tasks, which are used by the agents in monitoring resource performance and applying resource-use policies. Grid robustness and agility are enhanced by the use of dynamic, grid-generated query plans, as described above, and by the ability to balance loads across the grid. Altered grid topology, sources, and usage policies are automatically accommodated by generating new plans and rebalancing loads. Other grid conditions, such as fallen nodes, inaccessible sources, and revoked certificates, may be handled in similar fashion.

Furthermore, the fact that elements of the grid (agents and gateways) communicate with one another using a set of known, semantic, application-level messages may be used in securing communications among these elements against intrusions and malicious traffic. Thus, in some embodiments of the present invention, agents and/or gateways apply a semantic filter to each packet that they receive over the network and accept only packets that are compatible with the system ontology. Packets that do not meet the expected semantic criteria are discarded. Therefore, even if one of the elements of the grid is attacked by malicious traffic, the element will not permit the traffic to propagate into the grid. Moreover, gateways can examine each data element in the semantic payload of each packet to determine whether to pass it on or nullify it.

Although embodiments of the present invention are described herein with reference to information access and query handling, the principles of the present invention may similarly be applied to provision of other types of resources, such as Web services, over a network based on a semantic model.

There is therefore provided, in accordance with an embodiment of the present invention, a method for data access, including:

defining an ontology for application to a set of diverse data sources including data having predefined semantics;

associating with the ontology one or more logical rules applicable to the semantics of the data in the data sources;

receiving a query from a user regarding the data;

determining a query plan for responding to the query by selecting one or more of the data sources responsively to the ontology and by identifying an operation to be applied to the data responsively to the applicable logical rules; and generating a response to the query in accordance with the query plan.

In a disclosed embodiment, the logical rules include a validation rule, and the query plan includes validating the data from at least one of the data sources responsively to the validation rule.

Additionally or alternatively, the logical rules include a mapping rule, such that data sources that match these rules can be automatically mapped to the ontology when the sources are primed and attached to the grid. Further additionally or alternatively, the logical rules include a joining rule, and the query plan includes selecting a key responsively to the joining rule, and joining the data from two or more of the data sources using the key. Typically, selecting the key includes analyzing the data so as to select one or more fields in the two or more of the data sources for use as the key so as to provide a desired statistical probability that the data will be joined correctly.

Yet further additionally or alternatively, the logical rules include a transformation rule, and the query plan includes transforming the data in at least one of the data sources from a first value that is held in the at least one of the data sources to a second value responsively to the transformation rule.

Still further additionally or alternatively, the logical rules include a business logic rule, and the query plan includes processing the data from at least one of the sources responsively to the business logic rule.

The logic rules may also include an access rule, and the query plan may include selecting at least one of the data sources for use in generating the response responsively to the access rule as applied to the user and client who submitted the query.

In some embodiments, defining the ontology includes associating a respective wrapper with each of the data sources, so as to transform the data from each of the data sources from a native format to an ontological format determined by the ontology, and generating the response includes applying the operation using the wrapper, and then reporting the data from the wrapper to a hub that links the data sources following application of the operation.

In one embodiment, the operation applied by the wrapper includes joining the data from two or more of the data sources.

Additionally or alternatively, the operation applied by the wrapper includes mapping values of the data. For example, mapping the values may include normalizing the data from a native representation to an ontological representation.

Further additionally or alternatively, the query plan includes a group of sub-queries, and generating the response includes sending the sub-queries from an agent running on the hub to respective wrappers of a plurality of the data sources, and combining the data reported from the wrappers in order to produce the response. Typically, sending the sub-queries includes invoking two or more of the wrappers to operate in parallel.

In a disclosed embodiment, associating the respective wrapper includes distributing an advertisement of each of the data sources in accordance with the ontology, and determining the query plan includes discovering each of the data sources responsively to the advertisement, and building the query plan based on the discovered data sources.

In an aspect of the invention, reporting the data includes sending data packets over a network, the packets including semantic content in a form determined by the ontology, and upon receipt of the data packets at the hub, verifying legitimacy of the packets responsively to the semantic content and nullifying semantic elements that must be filtered.

Typically, reporting the data includes streaming the data from the wrapper to a specified storage location. Alternatively, reporting the data includes moving the data in a block operation from the wrapper to a specified storage location.

In another aspect of the invention, determining the query plan includes collecting information regarding a topology and performance characteristics of the data sources, and selecting, responsively to the information, the data sources to be used in responding to the query.

There is also provided, in accordance with an embodiment of the present invention, a method for providing a user with access to a set of diverse information resources, which are configured to provide information with predefined semantics, the method including:

defining an ontology for application to the information provided by the set of diverse information resources;

associating with the ontology one or more logical rules applicable to the semantics of the information;

receiving a request from the user to access the information;

determining a plan for responding to the request by selecting one or more of the information resources responsively to the ontology and by identifying an operation to be applied to the information responsively to the applicable logical rules; and generating a response to the request in accordance with the plan.

In a disclosed embodiment, the request includes a query for data held by the information resources.

In another embodiment, the request includes a subscription request, and generating the response includes providing a succession of responses over a period of time responsively to the subscription request.

In yet another embodiment, the information resources are configured to provide Web services, and the request specifies one or more of the Web services to be provided to the user.

In still another embodiment, the request specifies data to be written to a data repository associated with one or more of the information resources.

In a further embodiment, the request specifies a transaction to be carried out and recorded by one or more of the information resources.

In an additional embodiment, the request specifies a process to be carried out by one or more of the information resources. Typically, the request specifies an event, and generating the response includes carrying out the specified process responsively to an occurrence of the event.

There is additionally provided, in accordance with an embodiment of the present invention, a method for data access, including:

defining an ontology for application to a set of diverse data sources including data;

defining data access rights with respect to the ontology; and controlling user access to the data responsively to the ontology of the data and the access rights applicable thereto.

In a disclosed embodiment, defining the ontology includes specifying a user ontology, and defining the data access rights includes assigning a classification to a user according to the user ontology, and controlling the user access includes comparing the classification to the access rights applicable to the data. Typically, the diverse data sources are distributed among a set of autonomous organizations including at least first and second organizations, and assigning the classification includes classifying the user according to an organizational affiliation of the user so as to control access by users in the first organization to the data sources held by the second organization.

Typically, controlling the user access includes receiving a query from a user to access the data in the data sources, determining a query plan for responding to the query by selecting one or more of the data sources responsively to the ontology such that the access rights permit the user to access the data in the one or more of the data sources, and generating a response to the query in accordance with the query plan.

There is further provided, in accordance with an embodiment of the present invention, a method for data access, including:

defining a set of data resources providing access to data;

collecting information regarding a topology and performance characteristics of the data resources;

receiving a query from a user regarding the data;

determining a query plan responsively to the query and to the information regarding the topology and performance characteristics; and generating a response to the query in accordance with the query plan.

Typically, collecting the information includes measuring respective load levels of two or more of the data resources, and determining the query plan includes selecting one of the data resources so as to balance the load levels.

In a disclosed embodiment, the data resources are distributed among a set of autonomous organizations including at least first and second organizations, wherein the user submitting the query belongs to the first organization, and wherein determining the query plan includes selecting, responsively to the performance characteristics, one of the data resources of the second organization for use in responding to the query.

There is moreover provided, in accordance with an embodiment of the present invention, a method for exchange of information, including:

establishing a virtual private network among a plurality of nodes, including at least first and second nodes, which are configured to communicate with one another over an underlying public physical network;

defining a semantic communication model for conveying data packets among the nodes in the virtual private network, responsively to an ontology of the information;

sending a data packet over the virtual private network from the first node to the second node; and filtering the data packet against the semantic communication model at the second node, so as to verify that the data packet is legitimate and nullify semantic elements that must be filtered.

Typically, defining the semantic communication model includes defining a closed set of semantic messages that may be carried by data packets in the virtual private network.

In one embodiment, the nodes are distributed among a set of autonomous organizations.

In a disclosed embodiment, the nodes include gateway nodes, which are configured to communicate with clients and data sources using native data formats, and to translate the native data formats to the semantic communication model for communication over the virtual private network. Typically, the nodes further includes hub nodes, and establishing the virtual private network includes configuring the gateway nodes to communicate with the hub nodes using the semantic communication model.

There is furthermore provided, in accordance with an embodiment of the present invention, apparatus for data access, including a hub processor, which is adapted to receive a definition of an ontology for application to a set of diverse data sources including data having predefined semantics, and to associate with the ontology one or more logical rules applicable to the semantics of the data in the data sources, and which is further adapted, upon receiving a query from a user regarding the data, to determine a query plan for responding to the query by selecting one or more of the data sources responsively to the ontology and by identifying an operation to be applied to the data responsively to the applicable logical rules, and to generate a response to the query in accordance with the query plan.

There is also provided, in accordance with an embodiment of the present invention, apparatus for providing a user with access to a set of diverse information resources, which are configured to provide information with predefined semantics, the apparatus including a hub processor, which is adapted to receive a definition of an ontology for application to the information provided by the set of diverse information resources and to associate with the ontology one or more logical rules applicable to the semantics of the information, and which is further adapted, upon receiving a request from the user to access the information, to determine a plan for responding to the request by selecting one or more of the information resources responsively to the ontology and by identifying an operation to be applied to the information responsively to the applicable logical rules, and to generate a response to the request in accordance with the plan.

There is additionally provided, in accordance with an embodiment of the present invention, apparatus for data access, including a hub processor, which is adapted to receive a definition of an ontology for application to a set of diverse data sources including data and a definition of data access rights with respect to the ontology, and which is adapted to control user access to the data responsively to the ontology of the data and the access rights applicable thereto.

There is moreover provided, in accordance with an embodiment of the present invention, apparatus for data access, including a hub processor, which is adapted to receive a definition of a set of data resources providing access to data, and to collect information regarding a topology and performance characteristics of the data resources, and which is further adapted, upon receiving a query from a user regarding the data, to determine a query plan responsively to the query and to the information regarding the topology and performance characteristics, and to generate a response to the query in accordance with the query plan.

There is furthermore provided, in accordance with an embodiment of the present invention, apparatus for exchange of information, including a plurality of computing nodes, which include at least first and second nodes, and which are linked to communicate over a virtual private network running over an underlying public physical network, and which are configured to exchange data packets over the virtual private network in accordance with a semantic communication model, which is defined responsively to an ontology of the information, wherein at least the second node is adapted, upon receiving a data packet over the virtual private network from the first node, to filter the data packet against the semantic communication model so as to verify that the data packet is legitimate.

There is further provided, in accordance with an embodiment of the present invention, a computer software product, including a computer-readable medium in which program instructions are stored, which instructions, when read by a computer, cause the computer to receive a definition of an ontology for application to a set of diverse data sources including data having predefined semantics, and to associate with the ontology one or more logical rules applicable to the semantics of the data in the data sources, and further cause the computer, upon receiving a query from a user regarding the data, to determine a query plan for responding to the query by selecting one or more of the data sources responsively to the ontology and by identifying an operation to be applied to the data responsively to the applicable logical rules, and to generate a response to the query in accordance with the query plan.

There is also provided, in accordance with an embodiment of the present invention, a computer software product, for providing a user with access to a set of diverse information resources, which are configured to provide information with predefined semantics, the product including a computer-readable medium in which program instructions are stored, which instructions, when read by a computer, cause the computer to receive a definition of an ontology for application to the information provided by the set of diverse information resources and to associate with the ontology one or more logical rules applicable to the semantics of the information, and further cause the computer, upon receiving a request from the user to access the information, to determine a plan for responding to the request by selecting one or more of the information resources responsively to the ontology and by identifying an operation to be applied to the information responsively to the applicable logical rules, and to generate a response to the request in accordance with the plan.

There is additionally provided, in accordance with an embodiment of the present invention, a computer software product, including a computer-readable medium in which program instructions are stored, which instructions, when read by a computer, cause the computer to receive a definition of an ontology for application to a set of diverse data sources including data and a definition of data access rights with respect to the ontology, and to control user access to the data responsively to the ontology of the data and the access rights applicable thereto.

There is further provided, in accordance with an embodiment of the present invention, a computer software product, including a computer-readable medium in which program instructions are stored, which instructions, when read by a computer, cause the computer to receive a definition of a set of data resources providing access to data, and to collect information regarding a topology and performance characteristics of the data resources, and further cause the computer, upon receiving a query from a user regarding the data, to determine a query plan responsively to the query and to the information regarding the topology and performance characteristics, and to generate a response to the query in accordance with the query plan.

There is moreover provided, in accordance with an embodiment of the present invention, a computer software product, including a computer-readable medium in which program instructions are stored, which instructions, when read by a group of computing nodes that includes at least first and second nodes, linked to communicate over a physical public network, cause the computing nodes to communicate in a virtual private network by exchanging data packets over the public physical network in accordance with a semantic communication model, which is defined responsively to an ontology of the information, wherein the instructions cause at least the second node, upon receiving a data packet over the virtual private network from the first node, to filter the data packet against the semantic communication model so as to verify that the data packet is legitimate.

The present invention will be more fully understood from the following detailed description of the embodiments thereof, taken together with the drawings in which:

BRIEF DESCRIPTION OF THE DRAWINGS

FIGS. 2A and 2B are block diagrams that schematically show elements of an ontology-based data management system, in accordance with an embodiment of the present invention;

DETAILED DESCRIPTION OF EMBODIMENTS

Figure 1:
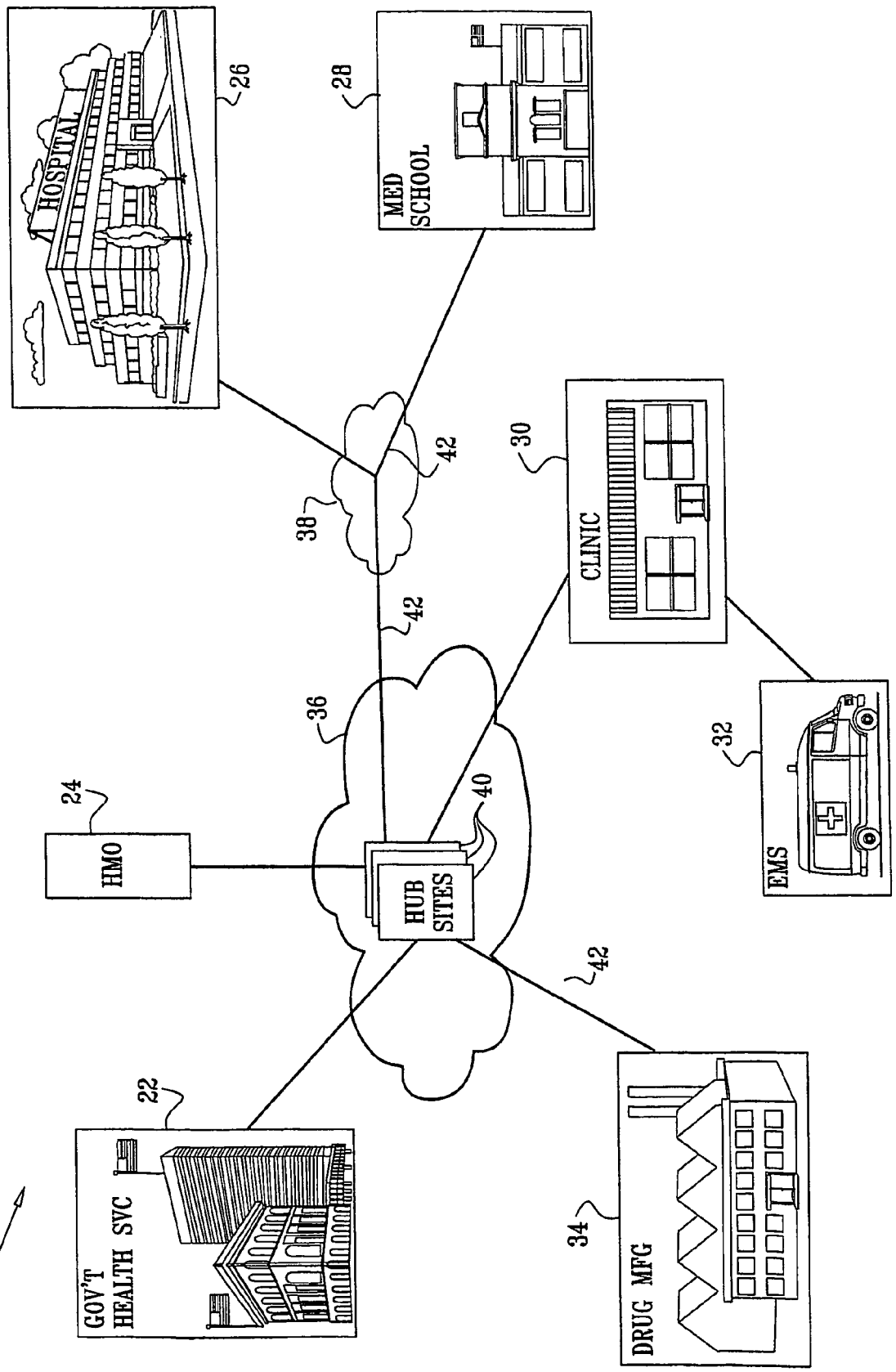
FIG. 1 is a schematic, pictorial illustration of a federated data management system, in accordance with an embodiment of the present invention.

FIG. 1 is a schematic, pictorial illustration of a federated system 20 for data management, in accordance with an embodiment of the present invention. System 20 crosses enterprise boundaries, in the sense that it involves multiple, autonomous organizations in sharing data and data management services. The example shown in FIG. 1 involves a "community" of health-care related organizations, including, for example, a governmental health service 22, a private HMO 24, a hospital 26, a medical school 28, a local clinic 30 with associated mobile emergency medical service 32, and a drug manufacturer 34. These organizations have a mutual interest in sharing certain information that is gathered and held by each of the bodies in its own data repositories. The information may relate to matters such as patient health records, billing for services, activities of medical personnel, and so forth. Sharing information can clearly enhance the effectiveness with which each of the organizations in system 20 carries out its functions.

On the other hand, the information to be shared within system 20 is typically held in many different data formats, at different locations within different organizations, with their own information models, structures and representations. To further complicate the situation, different databases frequently use different names to denote the same information. For example, hospital 26 may lists the names of persons using its services in a database field labeled "patients," while HMO 24 refers to the same names as "members." In addition, much of the information held by the organizations in system 20 is of a confidential nature. Therefore, in sharing information with other parties, each organization must ensure that access to information by other parties in the system does not violate its own confidentiality policies. Although these problems are illustrated here with respect to a healthcare-related system, it will be appreciated that similar problems arise in collaboration between organizations of other sorts, such as business enterprises or government agencies.

Embodiments of the present invention addresses the needs and problems outlined above by linking the participating organizations to exchange information over an internal, grid-managed virtual private network 42, with a semantic, ontology-based foundation. Physically, network 42 may run over existing, generic wide-area networks (WANs) 36, such as the Internet, and local area networks (LANs) 38. Logically, however, the users (clients) and data sources within system 20 are connected through secure, semantic links of virtual network 42 to a backbone of hubs 40. Although these hub nodes are shown in FIG. 1 as being logically located in WAN 36, in practice the hubs may be at any suitable physical location, either on the sites of participating organizations or at independent locations linked to network 42. Implementation of the features of system 20 and network 42 is described in detail with reference to the figures that follow.

As described in detail hereinbelow, embodiments of the present invention use several key inventive elements in addressing the needs of system 20:

(a) federated communities managing their ontologies;

(b) federated owners ("sites") managing their clients and sources;

(c) a fluid agent-based architecture that supports a growing set of semantic client services in a scalable and robust manner; and (d) a distributed grid platform of gateways and hubs (referred to hereinbelow simply as the "grid") that hosts the agents and ontologies and spans any number of sites for any number of communities in a secure, self-managed and self-adapting manner (thus creating, in effect a "grid of grids").

In describing embodiments the present invention, it is helpful to distinguish between priming, background and foreground tasks:

(a) Priming tasks are carried out by community and site administrators when assembling, growing, and evolving the grid. Examples of such tasks include wrapping and attaching a new source, adding a new site, altering a usage policy.

(b) Foreground tasks are carried out by the grid to respond to client requests during run-time, for example, executing a client query or subscription.

(c) Background tasks are carried out by the grid to maintain, self-adapt, and improve services. Examples of background tasks include periodically checking source integrity, producing auxiliary tables for more efficient joins, dynamically indexing internal tables, and reconfiguring agents to better address dynamic global requirements.

Figure 2A:
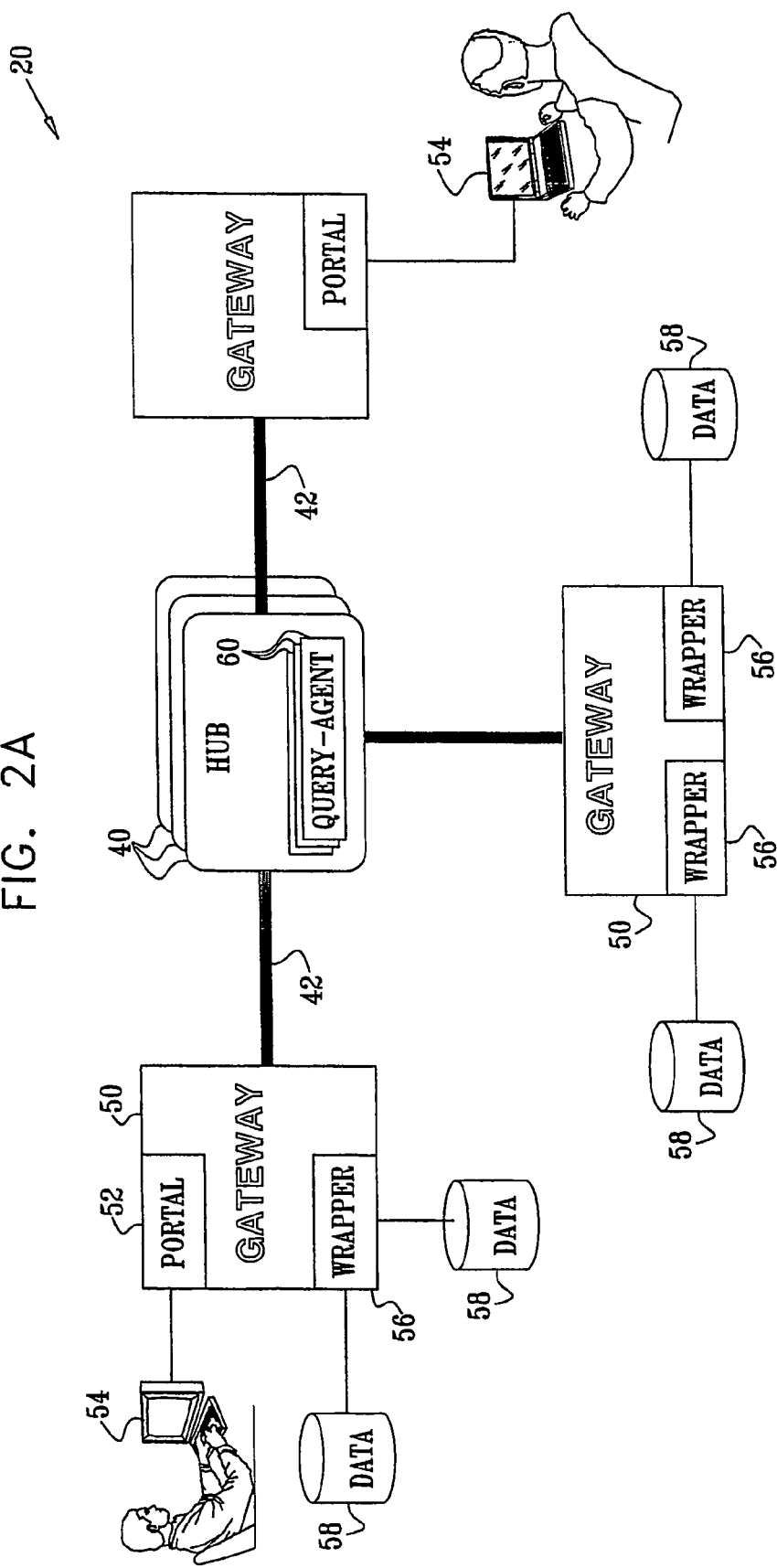

FIG. 2A is a block diagram that schematically illustrates the logical architecture of system 20, in accordance with an embodiment of the present invention. Typically, the elements of system 20 are implemented in the form of software running on suitable computer workstations or servers. This software maybe downloaded to the computer in question in electronic form, over a computer network, for example, or it may alternatively be provided on tangible media, such as optical, magnetic or electronic memory media. Although the elements of system 20 are shown in FIG. 2, for the sake of conceptual clarity, as separate functional blocks, in practice two or more of these elements may run on a single computer. Additionally or alternatively, the functions of a given block may be distributed among multiple computers.

Sites participating in system 20 are linked to network 42 by respective gateways 50. Gateways have two possible functions:

A portal 52 links clients 54 to network 42, for the purpose of submitting queries and receiving replies.

A wrapper 56 interfaces between data sources 58 and network 42, by translating data and messages between the native format of each data source and the ontological format used on network 42.

Portal 52 also handles security functions relating to the clients, such as user authentication and mapping to a community role. Similarly, wrapper 56 handles security functions relating to the data sources, such as representing an authorized role with appropriate credentials. These functions may be implemented as agents. As shown in the figure, a given gateway node may perform one or more instances of either or both of the portal and wrapper functions.

Query agents 60 run on hubs 40, wherein each hub may run one or more of these agents. Agents 60 receive queries from portals 52 and "compile" the queries into query plans that identify potential sources of the data. The query agents then carry out the plans by sending appropriate messages, referred to hereinbelow as sub-queries, to wrappers 56 requesting that they supply the required data from respective sources 58. When execution of the query plan is completed, agent 60 reports the results back to the requesting portal 52. The query planning and execution process is described in greater detail hereinbelow. Hubs 40 may also run agents of other types, such as subscription agents, i.e., agents that listen continuously for source, data, or grid-related events of a specified type in system 20, and then report the results of these events to a client. Further agent types are enumerated below.

In planning and executing queries, the query agent on hub 40 is assisted and supported by other hub utilities (not shown in the figure), which may also be implemented as agents. These utilities include the following:

Directory utilities maintain a registry ("directory") of nodes, agents, sources, clients and authorization certificates, and the capabilities, privileges, configurations and status of each.

Discovery utilities enable nodes and components (such as portals, wrappers and agents) to automatically discover, register, and link to other available nodes and components.

Ontology utilities provide access to all the ontologies that are used in system 20, as well as a comprehensive set of ontology-related services.

Messaging utilities support asynchronous message queuing facilities for all agents on network 42 regardless of location (even if the agents change location).

Matching utilities are applied by agents 60 in determining which data sources 58 are authorized and useful for responding to a specific client request.

Planning utilities compile abstract queries into concrete query plans of sub-queries and other data management actions (such as joins, filters and sorts) on the appropriate set of data sources. Details of this query compilation process are described below with reference to FIGS. 4, 5A and 5B.

Storage utilities provide persistent storage for registries, messages, posted client requests, query plans, cached results and other information used by agents 60.

Logging utilities provide distributed logging of system functions and load levels. These utilities may be used for management functions, such as monitoring, auditing, diagnostics and debugging, as well as for optimized dynamic query planning—compilation of query plans based on availability and load levels of system resources, as described hereinbelow.

Security utilities provide PKI (public key infrastructure) and authentication facilities for components.

An agent manager facilitates the agent life-cycle, for example, deploying authenticated agents on specific nodes, as well as running and suspending the agents in an orchestrated manner that enables grid reconfiguration without disrupting grid services.

FIG. 2B is a block diagram that schematically illustrates further details of the architecture and implementation of system 20. System 20 is shown to comprise multiple sites 61, each of which typically comprises multiple computers 62, which may be interconnected by LAN 38 on the site. Each of the functions of hub 40 or gateway 50 may run on a single computer on any given site or on multiple computers. Typically, to enhance scalability, gateways 50 are "thin," requiring only limited computing resources, and most of the computing power in system 20 is concentrated in the hubs. Query agents 60 run on hubs 40, and other agents 64, 65 may run on the hubs and gateways, as well, as noted above. For example, agents 65 on gateways 50 may comprise portal and wrapper agents. Local storage 63 is provided for use by the agents in carrying out their functions. In this implementation, computers 62 are configured to operate as Java platforms. The utilities described above are typically implemented in Java as conventional Remote Method Invocation (RMI) services, with additional HTTP tunneling when beneficial, such as to accommodate site firewalls. Agents 60, 64, 65 communicate via grid-wide messaging services 66.

Gateways 50 may serve any number of communities, but each hub 40 typically serves a specific community. Each community defines the nature of client services to be supported, possibly differentiating between different service priorities. Each service and priority is handled by an appropriate set of service agents 60, 64, for example, query and subscription agents, which communicate via messaging services 66 with portal and wrapper agents as needed. Multiple agents at different nodes can share in the handling of any specific service and priority by subscribing to a shared message queue 68 of pending requests. Similarly, portal agents 65 submitting multiple types of client service requests publish the requests to message queues 68 designated for handling each type of service request. Message queues are dynamically maintained by the distributed grid platform to facilitate changes in the current configuration of services and agents.

In this embodiment, each gateway 50 is configured to connect to a specific set of hubs 40. Each community maintains a list of hubs serving that community so that the hubs can readily discover each other. A dynamic grid-wide directory 67 maintains the current state of nodes (gateways and hubs) and connectivity, as well as a registry of all sources, clients, and agents accessible via these nodes. Agents and other utilities ensure that the dynamic directory is kept up to date as part of their background activities. As noted earlier, all grid nodes and components are mutually authenticated, and an internal virtual private network is maintained to produce a secure grid substrate.

When one of clients 54 submits a service request to one of portal agents 65 on its gateway 50, this request is queued to all hub agents 60, 64 that have subscribed to such requests. An agent picks up the request, produces a concrete plan for executing it, and then executes it with the assistance of other agents, such as the source wrapper agents 65 needed to produce the results. In such a case, each wrapper agent receives an appropriate sub-request via its queue. The results of the sub-request are stored directly in storage 63 at a predetermined location. The servicing hub agent then collects these partial results to produce final results in the same storage location or any other storage location. A link to the final results is then sent to the originating portal agent via its message queue.

As implied by this description, the grid topology and consistency is fluid enough to accommodate change without disruption. Thus, for example, if a source becomes unavailable, its wrapper agent will update the directory. Thereafter, all agents with ongoing tasks that use this source can either produce a new plan of action without the source or return results with an appropriate exception (assuming the source plays a non-critical part in the current query plan). If a grid node fails, agents running on that node can be restarted at other nodes. A grid-wide replication service supports replicated components, including replicated directories and messages, so that there is no single point of failure.

Figure 3:
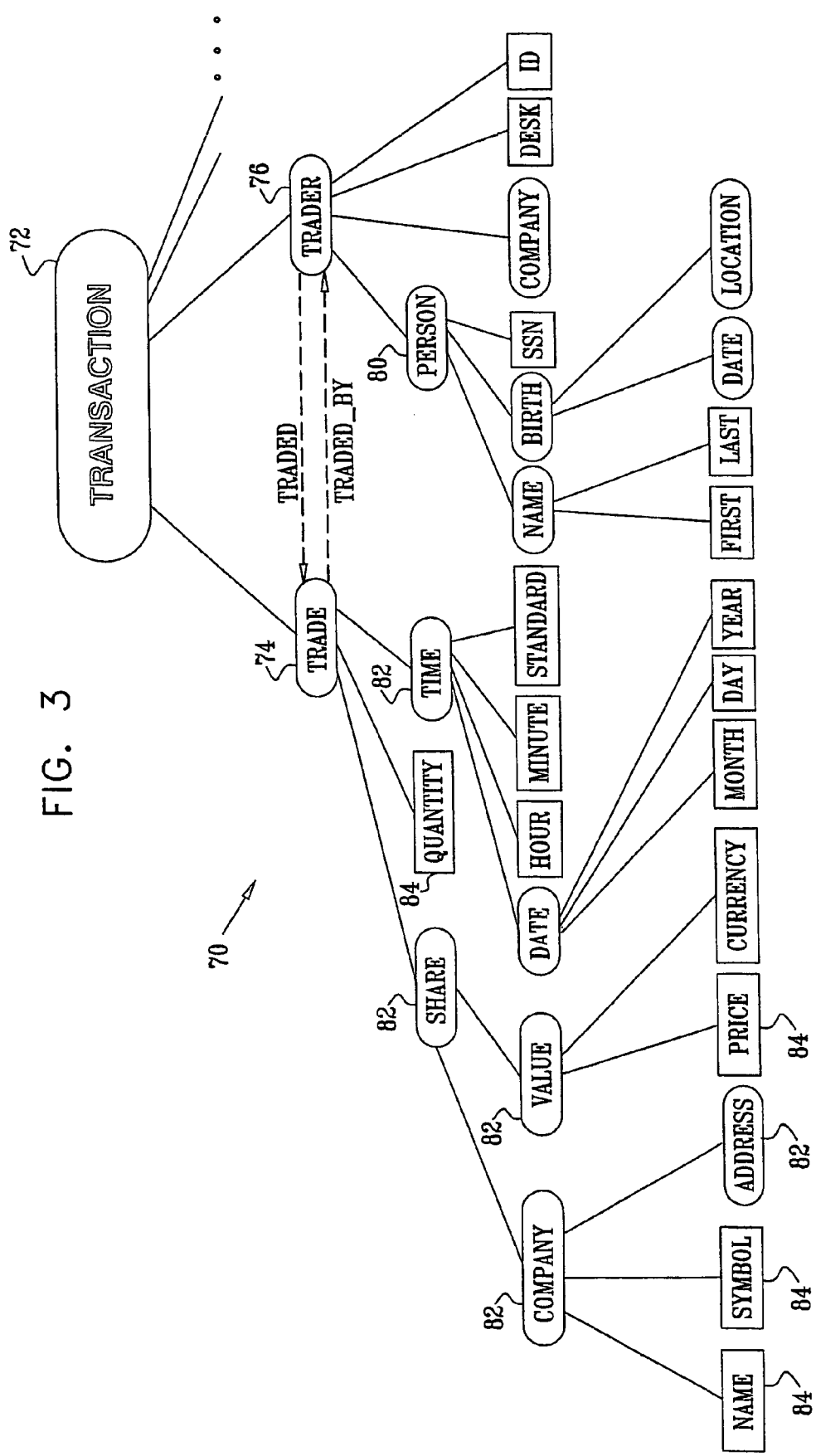
FIG. 3 is a graph that schematically illustrates an exemplary ontology.

FIG. 3 is a graph that schematically shows an ontology 70 that may be used in system 20, in accordance with an embodiment of the present invention. This exemplary ontology relates to the domain of securities transactions 72, but of course, similar ontologies may be defined for other domains, such as the healthcare domain illustrated in FIG. 1. Furthermore, in system 20, ontologies are used not only for organizing data held in sources 58, but also for holding meta-information regarding the system itself, such as network nodes, resources, users and policies, including access permissions by users to different resources and records.

Ontology 70 typically contains a hierarchy of classes, which provide a vocabulary for describing entities, such as people and vehicles, and their attributes, such as age and weight. (Ontology classes are commonly referred to as "entities" or "frames," and their attributes are referred to as "slots.") In the example shown in FIG. 3, the transaction ontology comprises entities identified as trades 74 and traders 76, with subsidiary entities 80, 82, 84 that contain elements and sub-elements of a trade (such as the share traded and the time it was traded) and of a trader making the trade (such as identifying details of the trader). Some entities, such as entities 80 and 82, contain further hierarchies of sub-entities, while other entities, such as entities 84, are closed.

As in object-oriented programming, inheritance may be used in ontology 70 to define multiple abstraction layers. Thus, trader 76 inherits the ontology of person 80, with sub-entities of name, birth date, social security number (SSN), etc. Each individual instance of a given entity, such as person 80, is a specific person or other object, with its own (presumably unique) set of attribute values.

Ontology 70 also defines relationships, by associating semantic labels with relationships that may exist between entities. For example, trader 76 makes trade 74, while trade 74 is traded by trader 76. Properties in the ontology define different aspects of the ontological slots and relationships, such as the slot types and cardinality, value ranges and statistics, and how one relationship is the inverse of another. Further general aspects of ontologies, including how ontologies may be created and their use in data management, are described in the references cited in the Background of the Invention. To permit data in sources 58 to be accessed via the ontological model of network 42, wrappers 56 map the metadata of the respective sources to corresponding entities and attributes of the ontology. Automated methods for carrying out this mapping are describe hereinbelow.

In embodiments of the present invention, the ontologies used in system 20 incorporate logical rules, which enable the ontology to capture generalized domain knowledge that can then be applied in query planning and execution. In an object-oriented framework, the rules may be expressed as methods associated with the object classes of the different entities in the ontology. Exemplary types of rules may include the following:

Validation rules, indicating properties that may be validly associated with a given entity. For example, a rule may state that persons listed as instances of traders 76 in the ontology must have ages between 18 and 75. If values in a data source are out of range or do not conform to a given statistical distribution, the validation rules in the ontology will identify the deviant entries.

Mapping rules, used to map source data structure and content to a given ontology during system priming. For example, a mapping rule may apply ontological properties of a specific column of source data in order to calculate the probability that the column of data actually does belong to a given frame and slot. A wrapper wizard, as described hereinbelow, or other gateway component may then suggest this mapping to a system manager for use in mapping the column to the ontology.

Joining rules, useful particularly in query planning and execution for purposes of joining data from multiple sources. Query agents use such rules to determine the probability that two records, with a given slot or set of slots serving as a joint key, do indeed belong to the same entity and instance. For example, a joining rule may state that if two person entities have the same social security number and the same first four letters of their last name, then they belong to the same person. Joining rules enable query agents to automatically infer which set of available slots should be used to join data from several sources in order to achieve the required level of uniqueness.

Transformation rules may be used to infer how values that reflect a given representation, language, or code scheme can be automatically transformed into another (for example, inches to centimeters).

Business logic rules are used to capture reusable domain-specific knowledge, such as the eligible age for a driving license in a given jurisdiction.

Policy rules can be used to control access to the ontology or to specific entities and attributes in the ontology. Note that in a community of multiple, federated organizations, each organization still sets its own access policies. The common ontology, however, permits the rules to be promulgated in a shared format and to cover different types of content. For example, a policy rule could impose a constraint that only users with given roles in system 20 or belonging to a specific organization or group in the system may access a given data source. Such a rule might further permit such users to read a specific set of slots in the data source only after they have been biometrically authenticated, and after the client computer that they are using has also been authenticated and confirmed to be linked to network 42 by a suitable private link. Whereas content is generally mapped to an ontology that is domain-specific for the community in question, access-related ontology may be generic to multiple content types.

In the federated model exemplified by FIG. 1, management of data resources, ontologies and associated rules is decentralized. Participant organizations are able to set their own rules in the context of a common, generic ontology, which is centrally defined. Some of the rules may be determined and input to system 20 by system managers and/or users, while others may be inferred automatically by services running in the system. Some automated methods for rule generation are described hereinbelow with reference to FIG. 8.

Figure 4:
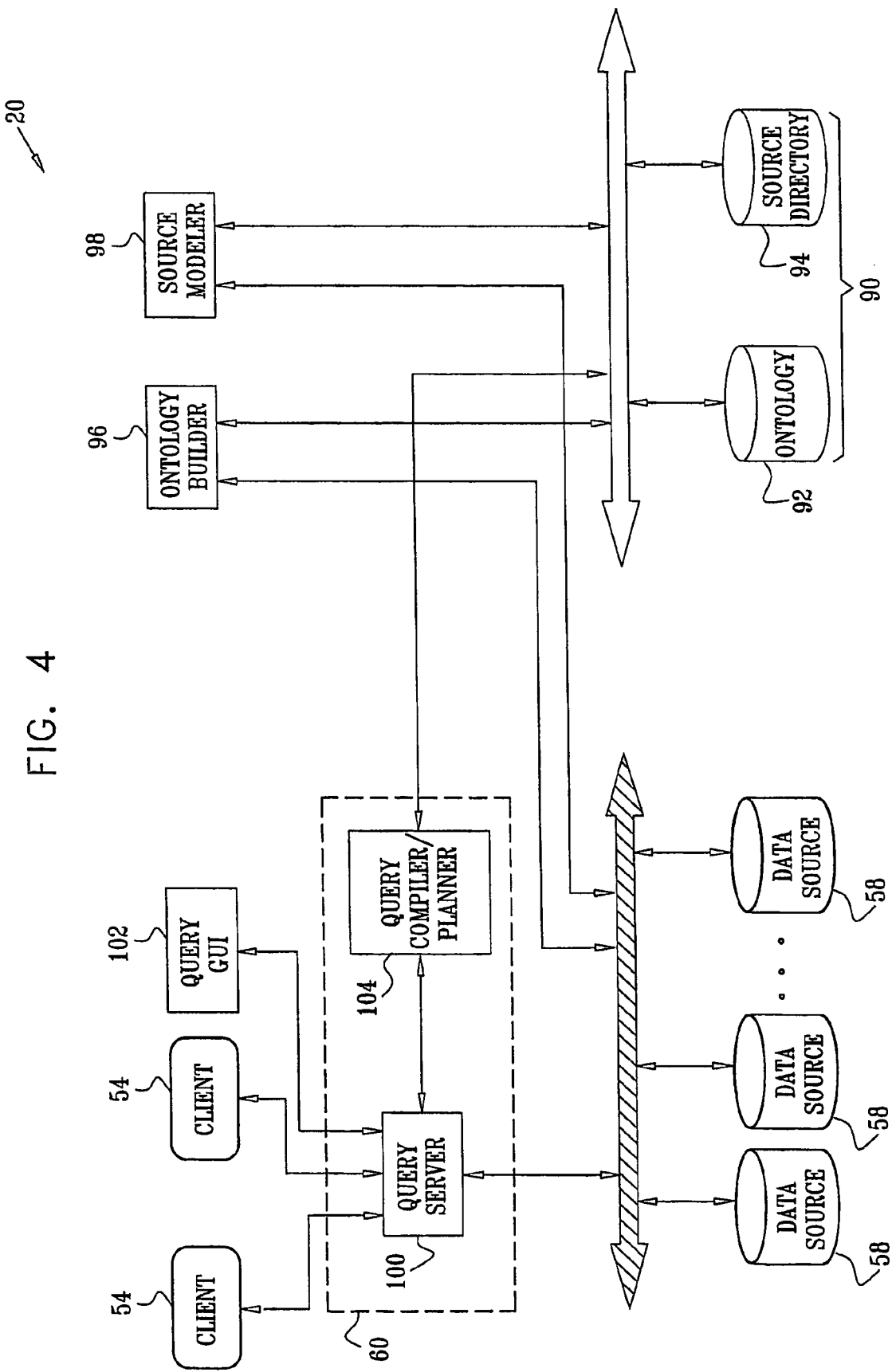
FIG. 4 is a block diagram that schematically illustrates elements of a data management system that are used in query planning and response, in accordance with an embodiment of the present invention.

FIG. 4 is a block diagram that schematically illustrates elements of system 20 that are used in query planning, in accordance with an embodiment of the present invention. This figure focuses on certain functions of query agent 60 and associated utilities. Other elements of the system, such as gateways 50, which are not essential to an understanding of query compilation, are omitted from the figure.

Agent 60 relies on a unified metadata model 90 in compiling query plans. The metadata model includes an ontology 92, as described above, and a source directory 94. A semi-automated ontology builder 96 may be used to generate and modify ontology 92, typically under control of a system manager. The ontology builder then maps data structures in sources 58 to the terms in the ontology. A source modeler 98 maps sources 58 themselves to source directory 94, based on the ontology of sources in system 20. User access privileges are similarly maintained in the source directory in ontological terms.

Queries composed by clients 54 are submitted to a query server 100. The queries may be composed using a graphical user interface (GUI) 102, which enables users to browse and query all authorized data in ontological terms. In other words, the users are not limited to predetermined views of the data in sources 58, as in conventional database management systems, but may rather choose any combination of data and sources that they are authorized to access (based on the policies contained in the system ontology, as described above).

Query server 100 refers user queries to a query compiler 104, which composes a query plan for responding to each query. Query planning is described further hereinbelow with reference to FIGS. 5A and 5B. Much like a program compiler, which translates portable high level instructions into native machine instructions, query compiler 104 exploits ontology 92 and the database mappings and rules in source directory 94 to translate portable client queries into a set of sub-queries directed to specific sources 58 (via their respective wrappers). The client query is typically expressed in abstracted ontological terms, with no foreknowledge regarding the specific available sources and their structure. The sub-queries generated by compiler 104, on the other hand, comprise sequences of queries that can be submitted to specific sources to produce the required results.

Once the query plan has been compiled, server 100 addresses the query messages to the appropriate sources 58, and thus builds the query response for client 54.

Figure 5A:
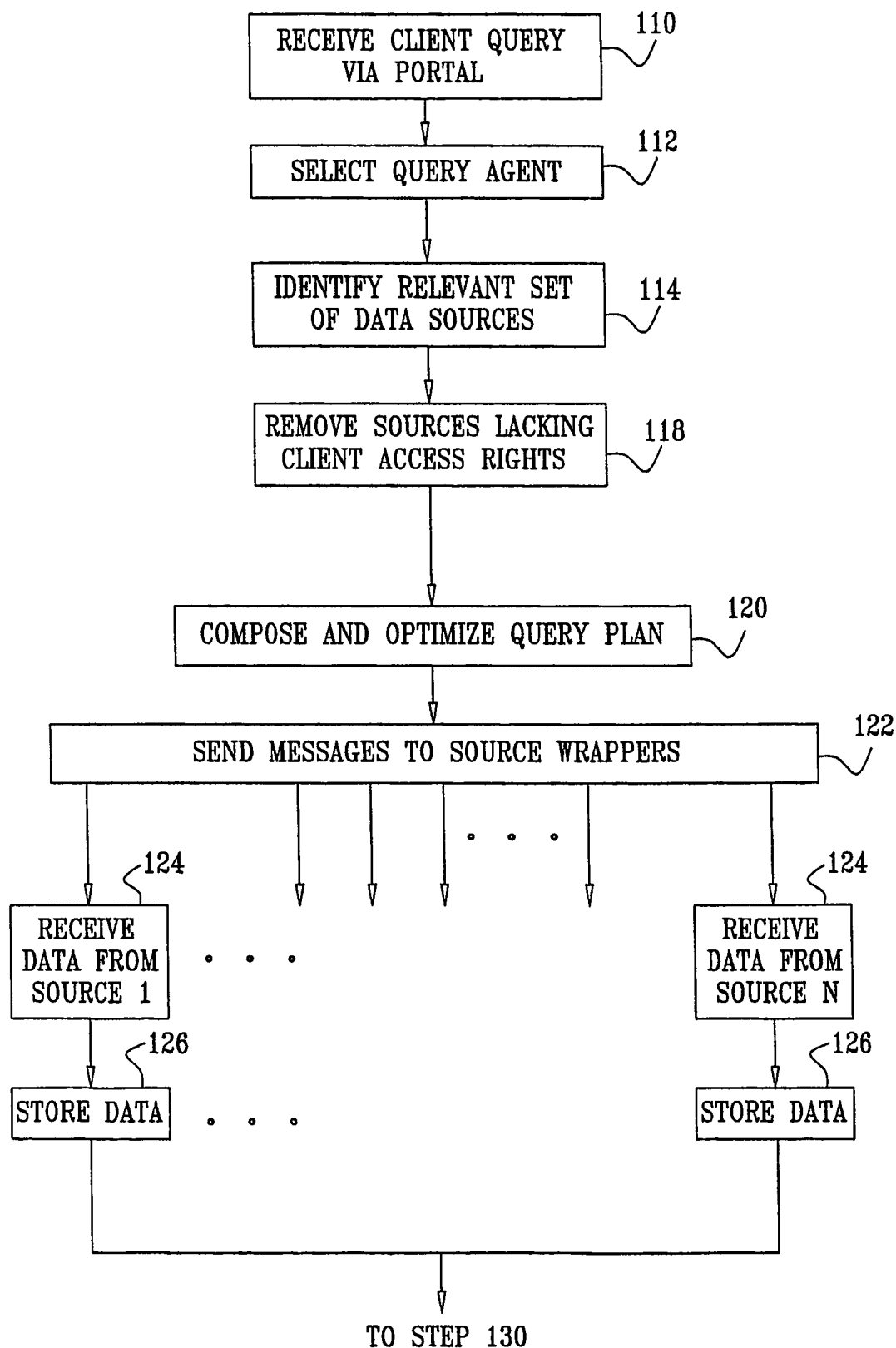
FIGS. 5A and 5B are flow charts that schematically illustrate a method for query planning and response; in accordance with an embodiment of the present invention.
Figure 5B:
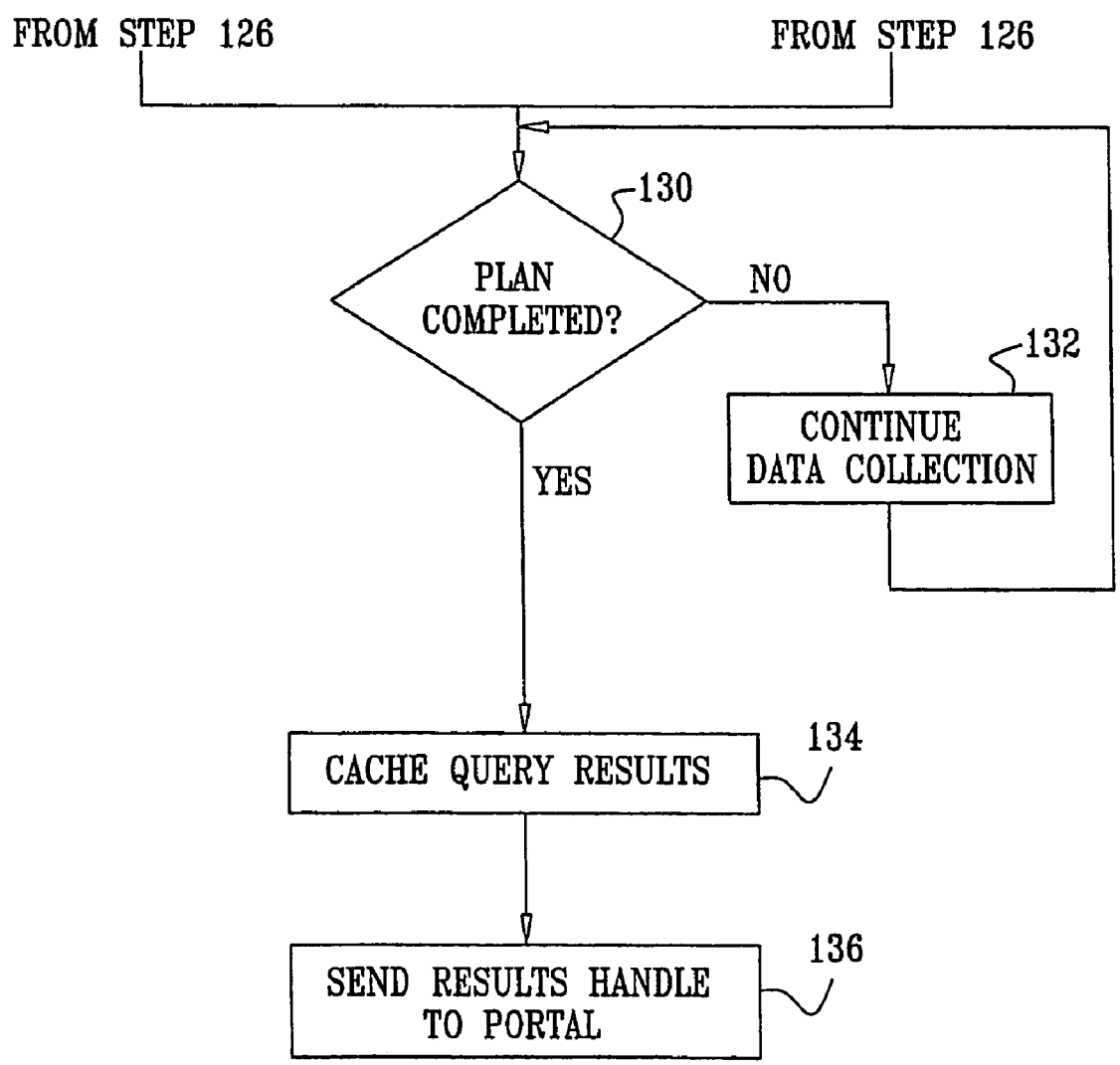

FIGS. 5A and 5B are a flow chart that schematically illustrates a method for query planning and execution, in accordance with an embodiment of the present invention. The method is initiated when portal 52 receives a query submitted by a user of client 54, at a query submission step 110. The portal authenticates the client and/or user credentials, and transforms the submitted query expressed in client terms (for example, in a structured query language [SQL] format) into an equivalent query expressed in ontological terms.

Portal 52 then selects a query agent 60 to carry out the query, at an agent selection step 112. The choice of query agent may take into account the resources available to the agent, its current work load, and its qualifications to deal with the given ontology of the query. Directory 67 (FIG. 2B), as mentioned above, may be used to collect and maintain information regarding changes in the topology and resource load of network 42. Thus, if the portal determines that one eligible query agent is overloaded, the portal may refer the query to a different agent. In the context of the federated system shown in FIG. 1, a portal on the site of one member organization may even address queries to agents resident on computers in other sites, subject to applicable policy constraints. Portal 52 then submits the ontological query to the selected query agent.

Query compiler 104 parses and analyzes the query and uses the matching utility mentioned above to produce a subset of data sources 58 (or equivalently, a subset of wrappers 56) that are relevant to the query, at a data source identification step 114. Selection of the data sources depends on the ontological terms of the query, the requested scope of the data, the client and user credentials, and the source use policies. Specifically, for each candidate data source, the query compiler checks the client and/or user identity against the access policies that are included in the source ontology, as listed in ontology 92, at an access checking step 118. Any source for which the query compiler determines that the client or user does not have sufficient access rights is removed from the query plan.

The query compiler next examines the query and the matched subset of data sources in order to compile the ontological query into an optimized query plan that best exploits the available data sources, at a query compilation step 120. Further aspects of query compilation and optimization are described below with reference to a specific query example in FIG. 7. As noted above, the query plan comprises sub-queries addressed to one or more sources 58, and subsequent joins that combine the normalized sub-query results to produce final results. Query agent 60 also allocates storage resources, via the above-mentioned storage utility, for collecting results during each stage of the plan.

Query agent 60 then executes the plan, sending appropriate sub-query messages to wrappers 56 of sources selected in the plan, at a message distribution step 122. The messages typically comprise handles to the storage resources allocated for the responses. Wrapper invocations are initiated in parallel whenever possible, as illustrated in the figure.

Wrappers 56 use the source mappings to translate the ontological sub-queries into the appropriate native terms of local data sources 58. Details of this process are shown below in FIG. 6. The resulting native sub-queries may typically be executed by the local database management system (DBMS) of the corresponding data source. Note, however, that sources 58 need not be databases, but may alternatively comprise other types of data (structured or unstructured), services and other applications. The wrappers may also perform normalization of the sub-query results based on translation terms provided in the sub-query, as well as other post-processing of returned values after the sub-query is executed. Each wrapper writes its processed data to the appropriate storage location, at a data reception step 124. Query agent 60 is notified, typically via the storage utility, using the storage handles, when the results have been appropriately normalized by the wrapper and stored, at a data storage step 126.

The query plan may call for joining, filtering, sorting and additional actions to be carried out by the query agent upon subsets of results at various stages. The query agent keeps track of the wrapper notifications and uses DBMS capabilities of the storage utility to carry out these actions when the result subsets are ready. The query agent also handles exceptions, such as when results are not obtained within designated response times. The query plan may indicate which results are critical to the query and which are not, so that the query agent can respond accordingly. For example, when a sub-query requesting non-critical results fails, the results may simply be omitted from the query response. On the other hand, critical results, if unavailable from the original intended source, may be procured by agent 60 from another source, based on the information in metadata sources 90.

Query agent 60 checks periodically to determine whether the query plan has been completed, at a completion checking step 130. As long as further results are still required in order to complete the query plan, the query agent continues to collect and process data from wrappers 56, at a continued collection step 132. Upon completion of the query plan, the query agent caches the results in an appropriate storage location, at a caching step 134. The agent then provides portal 52 with a handle to the final results, at a handle passing step 136. The portal transforms the cached results into client terms as needed, and delivers the results in the form requested by the client. All the above actions are typically logged by the logging utility, along with the credentials of the user and client that submitted the query, for auditing and accountability purposes.

Figure 6:
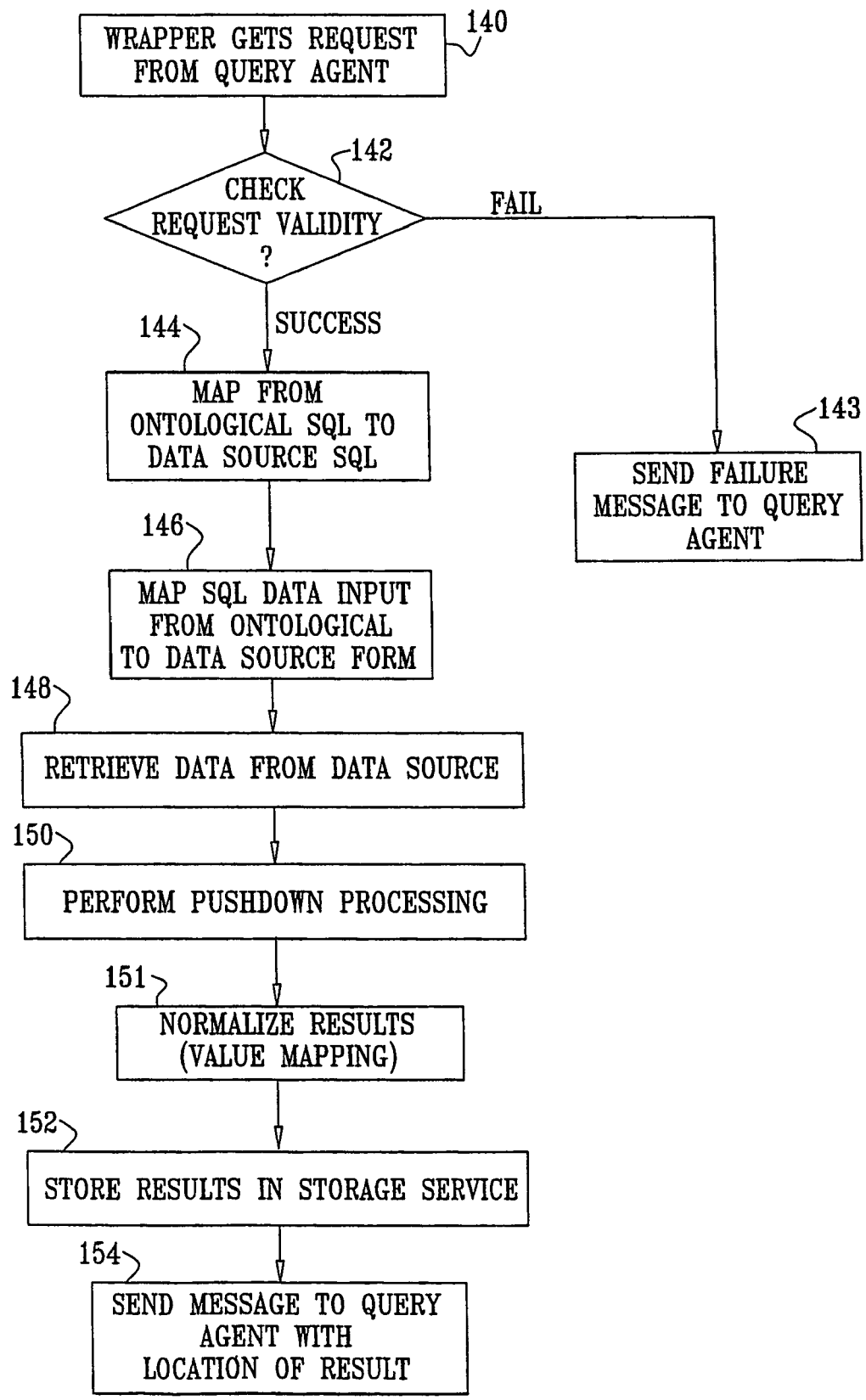
FIG. 6 is a flow chart that schematically illustrates a method by which a data source wrapper responds to a request made by a query agent, in accordance with an embodiment of the present invention.

FIG. 6 is a flow chart that schematically illustrates steps performed by wrapper 56 in responding to a sub-query addressed to it by query agent 60, in accordance with an embodiment of the present invention. This method is initiated when the wrapper receives a request for data from the query agent, at a data request step 140. The wrapper checks the validity of the request, at a validity checking step 142. A request may be invalid, for example, if it lacks the proper access authorization. If the request is found to be invalid (or if any of the subsequent steps in the method fails), the wrapper sends a failure message back to query agent 60, at a failure step 143. Possible responses of the query agent to failed sub-queries were described above.

As noted previously, the sub-query from agent 60 is typically stated in the ontological terms that are used in network 42. Wrapper 56 maps the sub-query from the ontological "SQL" used by agent 60 to the native query format that is understood by the data source 58 that wrapper 56 serves, at a query mapping step 144. Although FIG. 6, for the sake of convenience, refers to the native query format as a "data source SQL," the method shown in the figure is equally applicable to other types of data sources—not necessarily databases—and services that may be accessed in system 20. The sub-query may also contain data input, which is again expressed in the normalized, ontological units and format of network 42. Wrapper 56 similarly maps the SQL data from the ontological format to the native units and format of source 58, at a data mapping step 146. The wrapper then retrieves the requested data from source 58, using the local, native DBMS of the source, at a data retrieval step 148.

Figure 7:
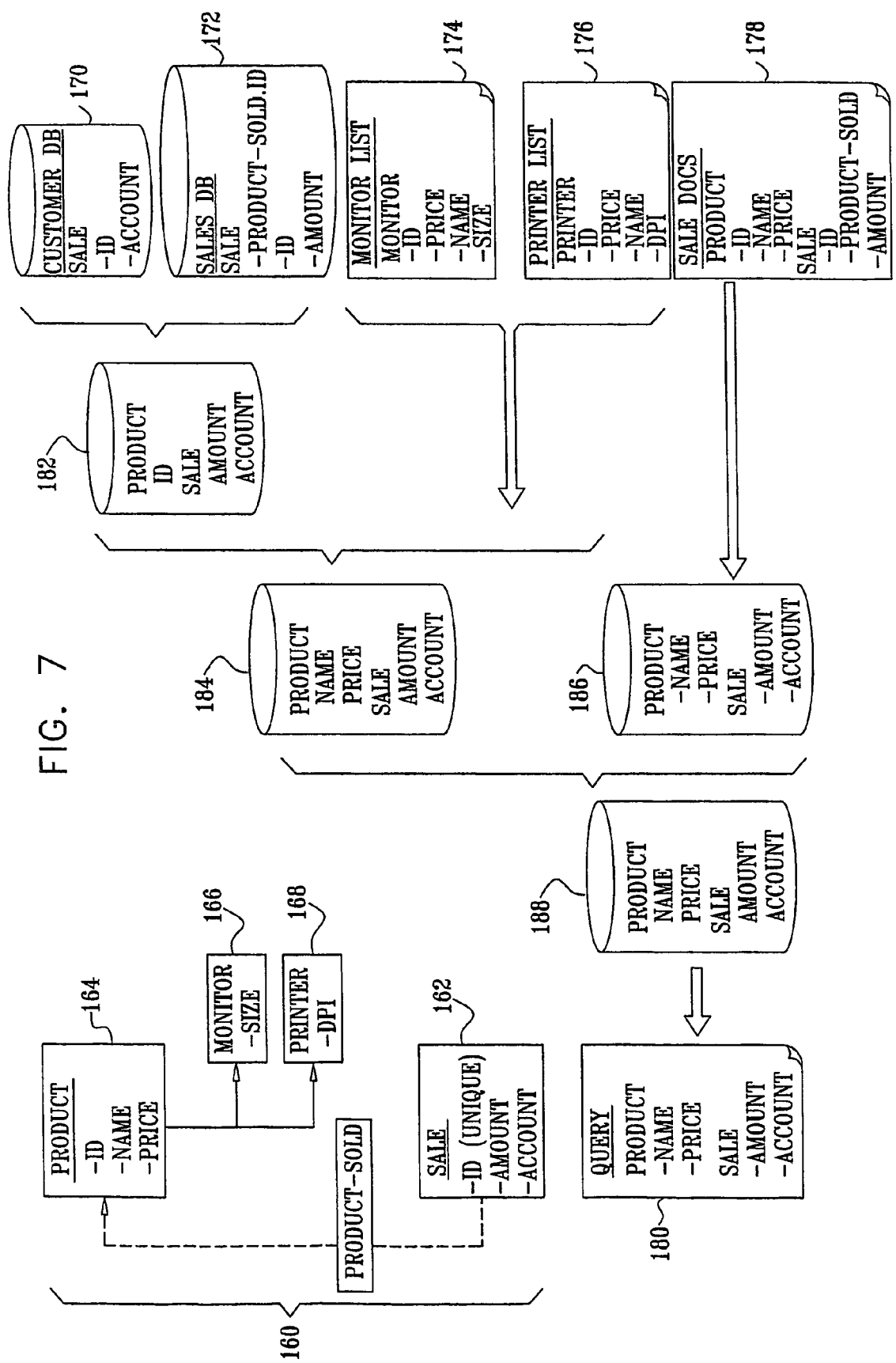
FIG. 7 is a block diagram that schematically illustrates elements of a query plan, in accordance with an embodiment of the present invention.

If required by the query plan, wrapper 56 may locally perform a part of the data processing required by the plan, at a pushdown step 150. This step may be carried out using the processing capabilities of the local DBMS or using processing capabilities built into the wrapper. The step may include, for example, joining values from multiple tables held in data source 58 or, additionally or alternatively, performing arithmetic or string operations on data values. Some examples are shown in FIG. 7. In addition, if necessary, wrapper 56 normalizes the data read from the data source, i.e., maps the data values from native units to the units used in the ontology, at a normalization step 151. Value mapping carried out by the wrapper may also include translation of text from one language to another.

After retrieving the data from source 58 and completing any required local processing, wrapper 56 normalizes the results in the appropriate ontological terms. The wrapper stores the results in the appropriate location using the above-mentioned storage service, at a data storage step 152 (corresponding to steps 124 and 126 in FIG. 5A). The wrapper then uses the storage service to send a message to query agent 60 indicating the location of the sub-query result, at a sub-query completion step 154. Where appropriate, wrapper 56 may stream data to agent 60, so that processing of the data can proceed even before all the sub-query results have been gathered. Alternatively, in other circumstances, the wrapper may move the data to a storage location specified by the agent in a block operation, such as a block move or block insert operation.

Although the scenario above relates to handling SQL-type queries, in alternative embodiments of the present invention, system 20 is configured to support a comprehensive set of information services, such as data updates, subscriptions, events, and backups. Each service is typically carried out by an appropriate type of service agent. Requests from clients 54 for services of these types are submitted by portal 52 to the appropriate service agent, which collaborates with other agents and invokes utilities as needed.

The following are a few examples of alternative service types that may be supported by system 20:

- A data writing service agent may use the same matching and planning processes as were described above to identify relevant sources 58 for update. Writing privileges in this case, as maintained in ontology 92, are typically more limited than reading privileges, so that client writes are of narrow scope. Wrappers 56 transform data updates expressed in ontological terms into the local terms to be written to the data sources. To maintain coherence, source writes are only written after all relevant sources commit. The wrappers may provide two-phase commit transaction support for sources that lack transactional support. Portal 52 then notifies client 54 as to whether or not the request was successfully completed.
- A process service agent may receive standard process definitions, which may be expressed, for example, in Business Process Execution Language (BPEL). The process definition may incorporate elements such as flow control, client notification/interaction, and other services of system 20. These other services (for example, queries, data write, and recursive processes) are executed by invoking the appropriate service agents.
- A transactional process service agent may be used to execute processes that require a two-phase commit.
- An event service agent may be used to handle requests for data-dependent events that prompt the activation of a process. Data events can be viewed as queries with constraints that produce non-empty results (i.e., when the query returns a result, the event has occurred). A query agent may thus be invoked to produce cached results that are examined to determine when the event has occurred. Some of sources 58 may themselves have active database capabilities, i.e., they may incorporate their own event-driven triggers. In this case, the event service agent may invoke the wrappers of these sources to manage the triggers and thus detect and report on events, so that it is in this case unnecessary to poll the sources. Otherwise, the wrappers may poll their sources at a frequency specified by the event service agent (subject to any throughput limits imposed by the source itself). The event service agent examines the results when they become available, such as when all wrappers have responded via trigger or polling. The event service agent invokes a process service agent to execute the appropriate process when the event has occurred.
- A subscription service agent handles requests from clients 54 for continuous queries. Depending on the query terms, the agent returns complete o r incremental results to the client on a periodic or event-driven basis. The subscription agent typically recruits query agents and/or event service agents to provide the results.
- A backup service agent may be invoked to record a copy of the results of a specified query on a designated hub or source. The results are maintained in ontological terms, and can thus be restored on any source 58 in source terms even if the source has evolved since the copy was recorded. The recorded results are tagged with the list of sources used to produce the results so that source restoration can be limited to the results that came from a given source.
- A history service agent may be used to produce time-tagged copies of specified data. The copies may be made periodically, or they may be event-driven. They may b e used for tracking and on-line analytical processing (OLAP) trend analysis.

FIG. 7 is a block diagram that schematically illustrates elements of a query plan carried out in system 20, in accordance with an embodiment of the present invention. For the purposes of this example, a simple ontology 160 is defined, comprising a sale entity 162 and a product entity 164. The entities are related by a product-sold relationship, identifying the product or products sold in each sale. The sale entity includes a number of attributes, including a unique order ID, as well as the sale amount and the customer account number. Each product entity includes a product BD (such as a catalog number), product name and price. The hierarchy of products in ontology 160 includes, in this example, two types of product entities: a monitor entity 166 and a printer entity 168, which are defined by inheritance from product entity 164 but have their own specific attributes (such as size or resolution).

The data sources available for responding to queries in this example include relational databases 170 and 172 and structured documents 174, 176, 178. It can be seen in the figure that the fields in the databases and documents have already been mapped by wrappers (not shown in this figure) to ontology 160. Thus, for example, a field that might have appeared in sales database 172 as the "purchase order number" has been mapped to the ID slot of sale entity 162, while another field labeled "catalog number" has been mapped to the ID slot of product entity 164.

A query 180 is now submitted to system 20, asking for a listing of products sold, by name and price, and the amounts and account numbers of sales in which these products have been sold. Query compiler 104 (FIG. 4) examines the contents of sources 170, 172, 174, 176, 178 to determine where the necessary information can be procured and how the information can be joined into a query response. The query plan developed by the compiler includes the following steps, which are typically formulated as sub-queries addressed to the wrappers of the data sources, as described above:

1. The wrapper of one or both of databases 170 and 172 generates an initial sub-query result 182 by performing an outer join of sales account data from customer database 170 and sales amount data from sales database 172. The wrapper uses the unique sale ID as a key. This outer join operation, as well as other operations described below, is thus "pushed down" to the local level of the databases and their wrappers in order to reduce the processing burden on hub 40 (FIG. 2) and to reduce the amount of communication traffic that must be carried by network 42.
2. The wrapper next takes a union of monitor list 174 and printer list 176, and then joins the name and price information from these lists into result 182 in order to create a combined sub-query result 184. In this case, the product ID is used as the key for joining the data. The wrapper also performs a complementation operation on the product names, i.e., it converts the names to lower-case characters to prevent errors in subsequent processing.

3. The wrapper of sale documents 178 performs a natural join over the documents in order to generate a second sub-query result 186. This sub-query may be performed in parallel with the sub-queries carried out in the two preceding steps. Here, too, product names are converted by the wrapper to lower case. The form of result 186 is identical to that of result 184, except that the account number field is null in this case. The query agent may ignore records that are partial or incomplete, or it may alternatively return these results with an indication of the missing values, depending on user preferences that accompany the query. In the present case, in order to ensure that the response to query 180 is complete and does not miss any product sales due to bad or missing data in any of the data sources, the query compiler has chosen to collect potentially duplicate results 184 and 186.

4. Agent 60 fakes a union of results 184 and 186 in order to generate a query response 188. The lower-case form of the product names enables the agent to avoid duplicating records due to anomalies in capitalization.

Selection of the keys to be used in joining data from different sources is a function of compiler 104. The compiler uses ontological rules in order to choose the optimal key to use in each case, so as to increase the likelihood of obtaining complete and unambiguous data.

For example, consider the case in which a query is submitted regarding a group of persons, requiring that query agent 60 provide contact data (such as address), personal data (such as age), and a vehicle registration number for each person. The data are assumed to be in different tables, and the query requires that they be joined for an authorized client. If all tables are contained in the same database, the source metadata will typically identify foreign keys for joining them. Otherwise, it is possible that the data are distributed among several sources, wherein each source has a field that has been mapped to the same distinct identifier, such as an employee number, or the unique sale ID number noted in the example above. In this case, the common identifying field or fields provide a solid base for joining the tables. Source directory 94 (FIG. 4) typically provides compiler 104 with this meta-information regarding possible keys. Assembly of this meta-information is one of the background tasks that may be carried out in system 20 in order to enhance accuracy of results and efficiency of query handling in runtime.

Otherwise, if not all the sources have fields mapped to distinct identifiers, compiler 104 may use rules contained in ontology 92 to find a key. For example, the ontology might reveal that a name and social security number can be transformed into a distinct identifier in this case, source fields mapped to the name and social security number can be used to join the relevant tables. Otherwise, compiler 104 may perform empirical tests to evaluate the statistical uniqueness of using the available non-distinct fields in these sources as the basis for joining. For example, the compiler may count the number of people in the target population that actually have the same name and age, and may then choose the most distinct combination as the key for joining the tables.

Even when distinct keys are available, erroneous data (such as misspelled names) and ambiguous formats (such as different U.S. and European date formats) can disrupt the joining process. Compiler 104 may use ontological rules and empirical testing to determine the likelihood that such cases exist. For example, the query agent may test for similar names that have identical social security numbers and home addresses. It may then construct an auxiliary join table to automatically translate similar names and other personal attributes into distinct person identifiers. Each entry in the table may also list the evaluated probability that the relationship it represents is valid. This auxiliary table can subsequently be used as the basis for joining data from the original tables, and also gives a well-defined measure of probability that the join was valid. Such join tables can be produced per class of entities or for specific subsets of each class.

Thus, for example, there may be several sources of person-related information, each with different column combinations that include different combinations or sub-combinations of name, social security number, address and telephone numbers. Using rules contained in the ontology, information in these tables could be correlated to identify which source records belong to which people. On this basis, a virtual person ID could be generated for each person, and an auxiliary table could be produced for each source containing the most probable person ID for each record and the confidence level of the person ID. Subsequent joins for person-related information could then use the grid-generated virtual IDs as long as the confidence levels exceed a threshold provided with the query.

Figure 8:
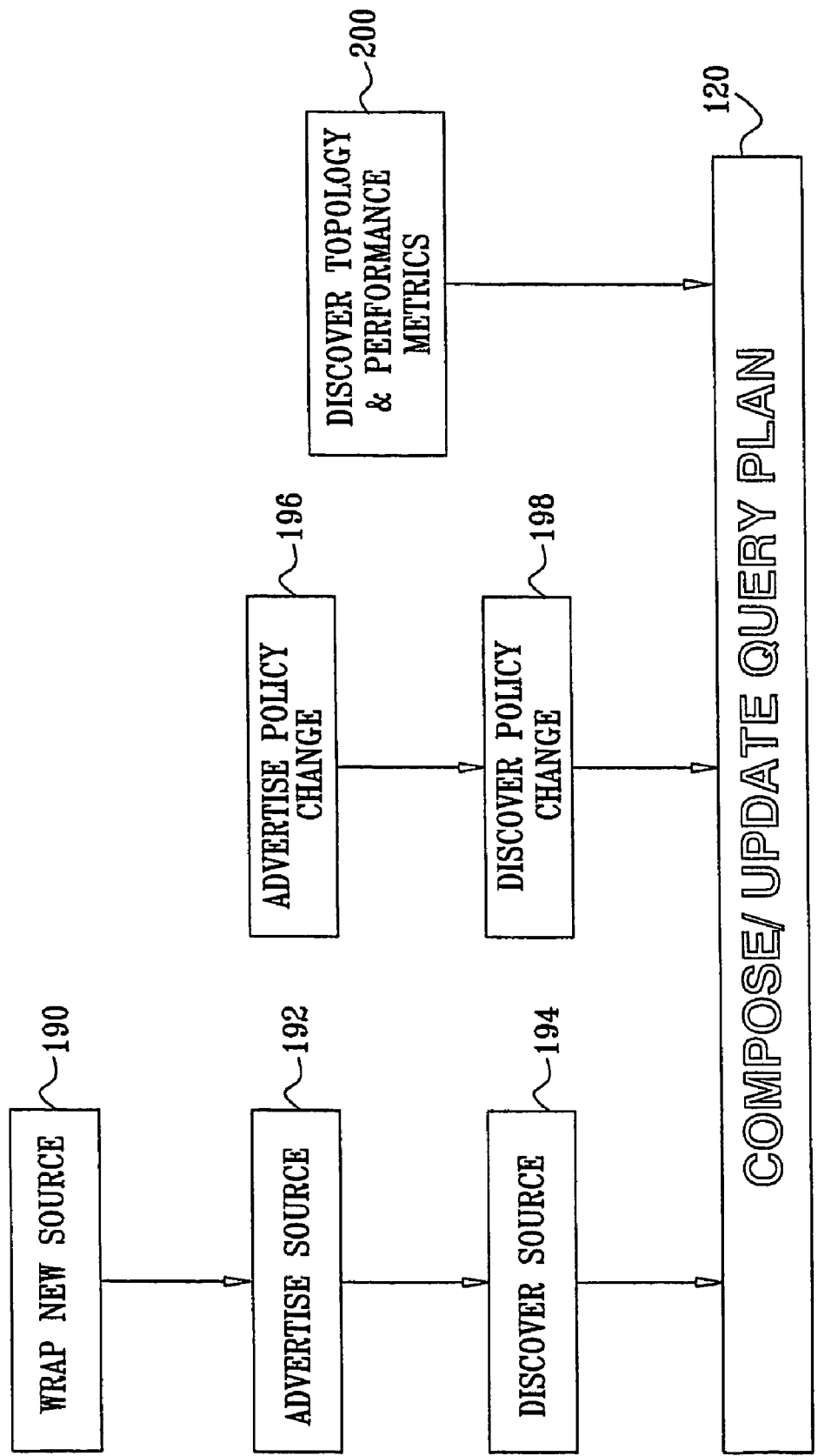
FIG. 8 is a flow chart that schematically illustrates background tasks carried out in a data management system, in accordance with an embodiment of the present invention.

FIG. 8 is a flow chart that schematically illustrates other background processes carried out in system 20 in order to generate information that can be used by compiler 104 in query planning and optimization, in accordance with an embodiment of the present invention. These functions are carried out, inter alia, by wrappers 56, as well as by ontology builder 96 and source modeler 98 and other services running on hubs 40. Some other background activities, such as building and maintaining ontologies 92 and generating auxiliary join tables, were already mentioned above.

New data sources may be added to system 20 on a "plug-and-play" basis. For this purpose, a wrapper is first created, in order to map the fields of the new source to the appropriate ontology, at a wrapper creation step 190. This step is typically carried out semi-automatically by a system manager, using a wrapper "wizard" program, as described below with reference to FIG. 9. Once the wrapper has been defined, the wrapper advertises the new source by sending appropriate messages over network 42, at a source advertisement step 192. The discovery utility on hubs 40 receives these messages, and informs source modeler 98. The source modeler then registers the appropriate source information in source directory 94, at a source discovery step 194.

Ontology builder 96 may also generate new ontology versions. For this purpose, the ontology builder applies a version management utility to automatically transform ontological expressions from one version to another. Similarly, source mappings to one ontology version are automatically upgraded in source directory 94 to new versions. Typically, ontological evolution consists mainly of expansion of the topology, with occasional renaming and merging of structures, so that forward and backward transformations between versions are relatively simple.

From time to time, the organizations participating in system 20 may choose to change use policies with respect to data sources 58 and other resources that they make available via network 42. Such policy changes are likewise advertised by wrappers 56, at a policy advertisement step 196, and are then discovered and recorded in source directory 94, at a policy discovery step 198.

During the normal course of activities of system 20, the above-mentioned logging utilities (which may run on both hubs 40 and gateways 50) track changes in the topology of network 42 and measure performance of various network functions, at a monitoring step 200. The monitoring semantics, like other functions of network 42, are based on a common, network-wide ontology, which defines entities such as queries submitted and answered, data transfer quantities and rates, duration of operations and timeouts. Activities are logged at the nodes at which they occur, so that the logs accumulate in a manner that does not disrupt messaging. Each log records each activity along with an identification of the request that generated it, so that a complete record of the handling of any particular request can be reconstructed end-to-end based on information held in the different logs. For the purpose of such logging, a network-wide system clock may be defined (despite the fact that the underlying physical network is asynchronous) by periodic distribution of appropriate timing messages, thus creating a "virtual time" that is uniform for all logs in system 20. As noted earlier, query agents 60 use the topology and performance data in order to perform load balancing among resources of system 20, even across boundaries of participating organizations. Ontology-based use policies ensure that the resources of one member organization will not be used by other organizations in the system beyond the level permitted by organization policies.

Figure 9A:
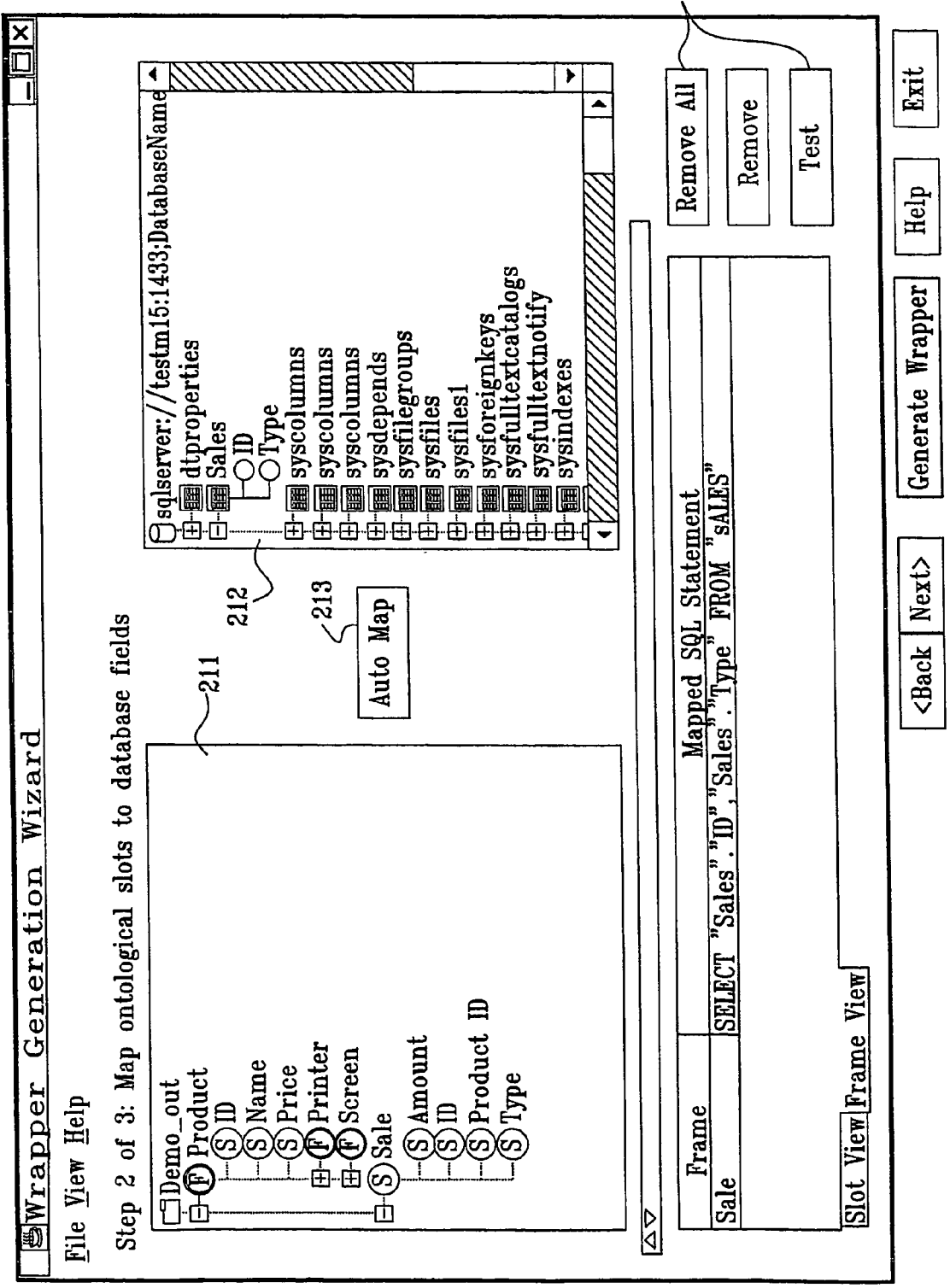
FIG. 9A is a schematic representation of a user interface screen for use in mapping a database to an ontology, in accordance with an embodiment of the present invention.

FIG. 9A is a schematic representation of a computer screen 210, showing a user interface provided by a wrapper wizard, in accordance with an embodiment of the present invention. Source modeler 98 provides this wizard in order to assist the system manager in the process of identifying the source structures, defining source mappings, and registering the source in directory 94. In the present example, the source is a relational SQL database, which is automatically loaded into modeler 98 along with the chosen ontology. The ontology is then displayed in an ontology window 211, while source metadata are displayed in a database window 212. The system manager uses a mouse to associate metadata entries in window 212 with corresponding slots in window 211, and to operate controls 213 in order to confirm or remove the mappings. Once the mapping is completed, the new source is advertised as described above.

Similar models may be used for wrapping data resources of other types. For example, if the resource is a Web service, the source Web service description language (WSDL) model may be automatically loaded into the source modeler, in place of the SQL metadata. Similarly, if the resource is an XML database, an XQuery server may be used to identify available schemata for mapping by the source modeler. For unstructured text, analytical tools such as those offered by ClearForest (New York, N.Y.) can be used to add XML tags to the text, which can then be indexed like an XML database. Likewise, models of this type may be used for mapping other elements of system 20 to the appropriate ontologies.

Figure 9B:
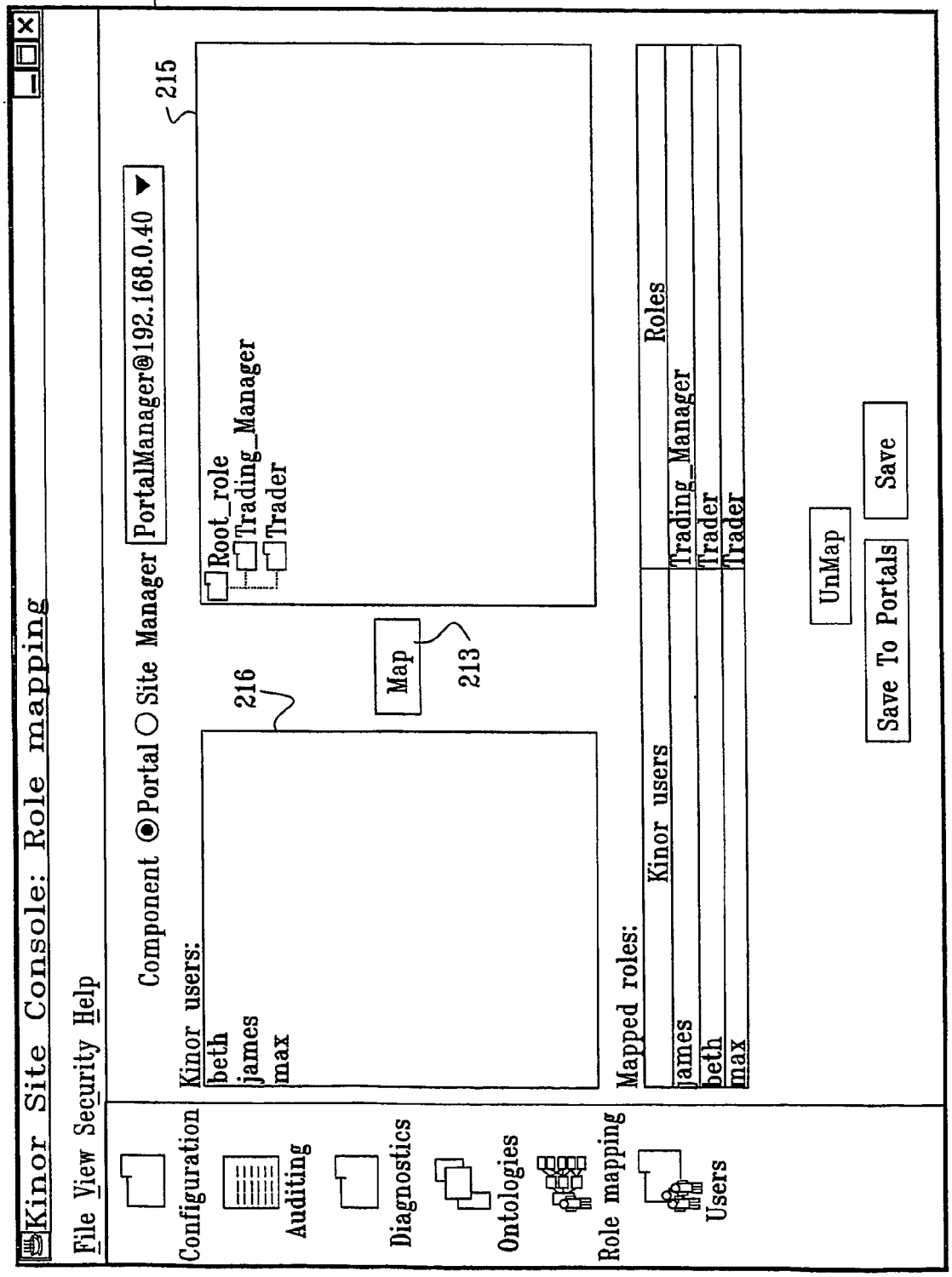
FIG. 9B is a schematic representation of a user interface screen for use in mapping local users to community roles, in accordance with an embodiment of the present invention.

FIG. 9B is a schematic representation of a computer screen 214, showing a user interface provided for the purpose of mapping users to ontological user classes, in accordance with an embodiment of the present invention. The mapping typically depends on the users' organizational affiliation and role within their respective organizations. Screen 214 includes an ontology window 215, in which user roles are listed, and a user window 216, listing the names of users in the organization in question. In this case, the system manager uses a mouse and controls 213 to associate each user in window 216 with the appropriate role in window 215. As noted above, access policies in system 20 are set by each organization and/or set globally with respect to the predefined ontology of roles.

Figure 10:
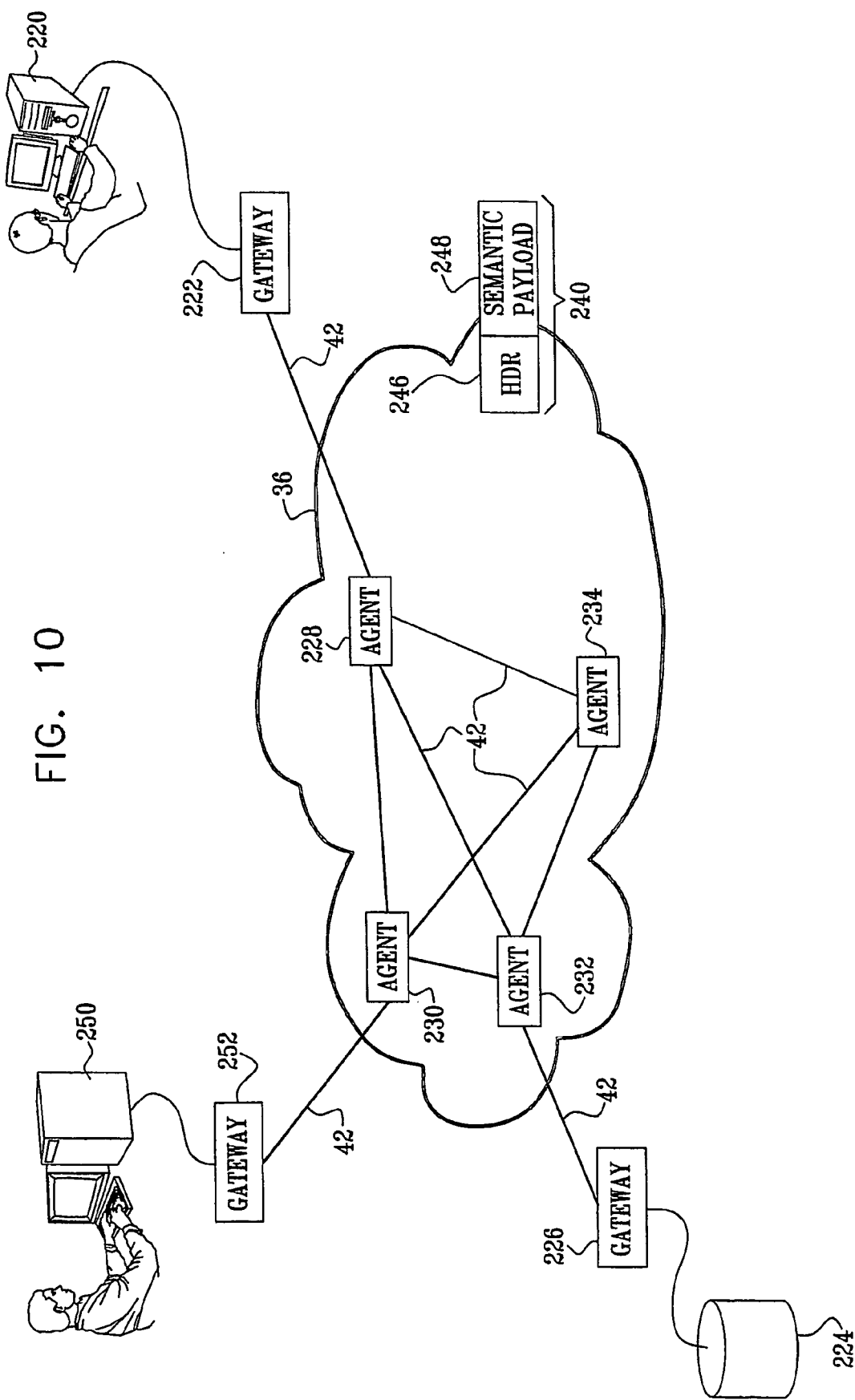
FIG. 10 is a block diagram that schematically illustrates elements of a virtual private network for a data access application, in accordance with an embodiment of the present invention.

FIG. 10 is a block diagram that schematically illustrates elements of virtual private network 42, in accordance with an embodiment of the present invention. This figure exemplifies the semantic nature of communications over network 42 and the benefits of such communications. As noted earlier, although network 42 may physically run over public networks, such as WAN 36, network 42 is logically separate from other communications that are carried by WAN 36. Separation of the virtual private network is maintained by techniques such as tunneling and encryption. Network 42 connects clients 220, 250 and sources 224 via gateways 222, 226 and 252 to a backbone of agents 228, 230, 232 and 234. Typically, the agents are logically connected in a full mesh grid topology, as shown in the figure.

Clients 220 and 250 may communicate with sources, such as source 224, only via the respective gateways and the backbone agents. All communications between the clients and the gateways are purely semantic in form, as are all communications between agents. An exemplary data packet 240 contains a message queue header 246 and a semantic payload 248. Header 246 comprises the logical addresses of the application-level source and destination of the packet (typically agents) and possibly other parameters. Payload 248 comprises a query, response or other system message. The contents of both header 246 and payload 248 are selected from a limited, predetermined set of possible semantic contents, which must conform to the specified ontology of system 20. This ontology is known to all of the agents.

Therefore, upon receiving a packet over network 42, the receiving agent can check the semantics of packet header 246 and payload 248 for conformance with the known ontology. In other words, the agent filters the header and payload against a limited set of known templates to which legitimate traffic must conform. Packets with non-conforming semantics are simply discarded, or filtered semantic elements are nullified. (By contrast, in generic IP networks, although a firewall or other intrusion protection device may check the packet payload for signatures of known malicious traffic types, the payload remains a "black box" of binary data, which cannot readily be diagnosed as benign or malicious.) Network 42 is thus substantially immune to malicious traffic attacks. Typically, for greater data security and intrusion prevention, header 246 and payload 248 are encrypted.

In a worst-case scenario, a malicious user, operating on client 250, for example, may "hack into" gateway 252, and may then bombard agent 230 with packets. Agent 230, however, will recognize that the packets do not have the proper semantics and will discard them. Even if the malicious user is successful in this manner in disrupting the performance of agent 230, the resultant traffic will not propagate further into network 42. Other clients, such as client 220, will still be able to access data sources through the remaining agents in the backbone grid.

Moreover, each client 220 and source 224 can determine which ontological elements it is willing to share and what security checks should be applied to each element before it is either sent or received. Since all shared information must correspond to ontological elements to flow through the grid, each owner is guaranteed that all incoming and outgoing flows comply with well-defined standards, regardless of the nature of the service being provided. This model is far less complex than the common alternative of screening binary information, which may assume any form for any number of clients and applications with no semantic basis.

As noted earlier, although the embodiments described above relate mainly to providing access to data sources, the principles of the present invention may similarly be applied in controlling access to and supply of other information resources, such as Web services, via a network. It will thus be appreciated that these embodiments are cited by way of example, and that the p resent invention is not limited to what has been particularly shown and described hereinabove.

Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for accessing data in a computer system including a set of diverse data sources comprising data, the method comprising:
   defining an ontology for application to said set of diverse data sources comprising data;
   defining data access rights with respect to the ontology;
   collecting information in an ongoing manner regarding characteristics of the data sources;
   storing said information in a storage device on said computer system;
   employing at least one of wrappers and agents to automatically discover new or altered data sources associated with versions of said ontology;
   automatically generating new ontology mappings of said data sources and said data access rights to said versions of said ontology in order to accommodate said new or altered data sources, without disrupting responses to queries on the basis of earlier versions of said ontology;
   automatically generating new versions of said wrappers and agents to correspond with new versions of said ontology; and
   automatically generating new versions of query plans to correspond with new versions of said ontology,
   said automatically generating new ontology mappings, said automatically generating new versions of said wrappers and agents and said automatically generating new versions of query plans taking place without disruption of query response functionality of said computer system.

2. The method according to claim 1, wherein defining the ontology comprises specifying a user ontology, and wherein defining the data access rights comprises assigning a classification to a user according to the user ontology, and also comprising comparing the classification to the access rights applicable to the data.

3. The method according to claim 2, wherein the diverse data sources are distributed among a set of autonomous organizations comprising at least first and second organizations, and wherein assigning the classification comprises classifying the user according to an organizational affiliation of the user so as to control access by users in the first organization to the data sources held by the second organization.

4. The method according to claim 1, and also comprising receiving a query from a user to access the data in the data sources, determining a query plan for responding to the query by selecting one or more of the data sources responsively to the ontology such that the access rights permit the user to access the data in the one or more of the data sources, and generating a response to the query in accordance with the query plan.

5. The method according to claim 1, and comprising:
   associating with the ontology one or more logical rules applicable to semantics of the data in the data sources;
   receiving a query from a user regarding the data;
   determining a query plan for responding to the query by selecting one or more of the data sources responsively to the ontology and by identifying an operation to be applied to the data responsively to the applicable logical rules; and
   generating a response to the query in accordance with the query plan.

6. The method according to claim 5, wherein the logical rules comprise a joining rule, and wherein the query plan comprises selecting a key responsively to the joining rule, and joining the data from two or more of the data sources using the key, and
   wherein the selecting a key comprises analyzing the data so as to select one or more fields in the two or more of the data sources for use as the key so as to provide a desired statistical probability that the data will be joined correctly.

7. The method according to claim 5, wherein the logical rules comprise an access rule, and wherein the query plan comprises selecting at least one of the data sources for use in generating the response responsively to the access rule as applied to the user who submitted the query.

8. The method according to claim 1, and comprising:
   collecting information regarding a topology and performance characteristics of the data sources;
   receiving a query from a user regarding the data;
   determining a query plan responsively to the query and to the information regarding the topology and performance characteristics; and
   generating a response to the query in accordance with the query plan.

9. The method according to claim 8, wherein the data sources are distributed among a set of autonomous organizations comprising at least first and second organizations, wherein the user submitting the query belongs to the first organization, and wherein determining the query plan comprises selecting, responsively to the performance characteristics, at least one of the data sources of the second organization for use in responding to the query.

10. A computer software product, comprising a computer-readable medium in which program instructions are stored, which instructions, when read by a computer, cause the computer to:
    receive a definition of an ontology for application to a set of diverse data sources comprising data and a definition of data access rights with respect to the ontology;
    collect information in an ongoing manner regarding characteristics of the data sources;
    store said information in a computer-readable manner;
    employ at least one of wrappers and agents to automatically discover new or altered data sources associated with versions of said ontology;
    automatically generate new ontology mappings of said data sources and said data access rights to said versions of said ontology in order to accommodate said new or altered data sources, without disrupting responses to queries on the basis of earlier versions of said ontology;
    automatically generate new versions of said wrappers and agents to correspond with new versions of said ontology; and
    automatically generate new versions of query plans to correspond with new versions of said ontology,
    wherein said automatically generate new ontology mappings, said automatically generate new versions of said wrappers and agents and said automatically generate new versions of query plans take place without disruption of query response functionality of said product.

11. The product according to claim 10, wherein the diverse data sources are distributed among a set of autonomous organizations comprising at least first and second organizations, and wherein the instructions cause the computer to classify a user according to an organizational affiliation of the user so as to control access by users in the first organization to the data sources held by the second organization.

12. The product according to claim 10, wherein the instructions cause the computer to associate with the ontology one or more logical rules applicable to the semantics of the data in the data sources, and further cause the computer, upon receiving a query from a user regarding the data, to determine a query plan for responding to the query by selecting one or more of the data sources responsively to the ontology and by identifying an operation to be applied to the data responsively to the applicable logical rules, and to generate a response to the query in accordance with the query plan.

13. The product according to claim 10, wherein the instructions cause the computer to collect information regarding a topology and performance characteristics of the data sources, and further cause the computer, upon receiving a query from a user regarding the data, to determine a query plan responsively to the query and to the information regarding the topology and performance characteristics, and to generate a response to the query in accordance with the query plan.

* * * * *